(12) United States Patent
Prigge et al.

(10) Patent No.: US 12,530,346 B2
(45) Date of Patent: Jan. 20, 2026

(54) DATA TRANSMISSION FILTERING THROUGH A CUSTOMIZED FILTER LIST

(71) Applicant: Solutran, LLC, Minneapolis, MN (US)

(72) Inventors: Jason Lynn Prigge, Maple Grove, MN (US); Marcus Moreno, Minneapolis, MN (US); Barry J. Nordstrand, Excelsior, MN (US)

(73) Assignee: Solutran, LLC, Minneapolis, MN (US)

( * ) Notice: Subject to any disclaimer, the term of this patent is extended or adjusted under 35 U.S.C. 154(b) by 0 days.

(21) Appl. No.: 18/067,526

(22) Filed: Dec. 16, 2022

(65) Prior Publication Data

US 2023/0205767 A1 Jun. 29, 2023

Related U.S. Application Data

(60) Provisional application No. 63/293,720, filed on Dec. 24, 2021.

(51) Int. Cl.
*G06F 16/20* (2019.01)
*G06F 3/0482* (2013.01)
(Continued)

(52) U.S. Cl.
CPC ........ *G06F 16/2425* (2019.01); *G06F 3/0482* (2013.01); *G06F 16/381* (2019.01);
(Continued)

(58) Field of Classification Search
CPC ........... G06F 16/2425; G06F 16/24564; G06F 16/381; G06F 16/81; G06F 16/9035;
(Continued)

(56) References Cited

U.S. PATENT DOCUMENTS

| 3,947,660 A | 3/1976 | Saito |
| 6,684,195 B1 | 1/2004 | Deaton et al. |
| (Continued) | | |

FOREIGN PATENT DOCUMENTS

| CA | 2905500 A1 | 9/2014 |
| WO | 2009/145336 A1 | 12/2009 |
| WO | 2009/145366 A1 | 12/2009 |

OTHER PUBLICATIONS

"American National Standard for Financial Services," ANS X9.93/2008, Financial Transaction Messages—Electronic Benefits Transfer (EBT)—Part 1: Messages, (19 pages), Oct. 24, 2008, available online: URL: https://webstore.ansi.org/preview-pages/ASCX9/preview_X9.93-1-2008.pdf.

(Continued)

*Primary Examiner* — Diedra McQuitery
(74) *Attorney, Agent, or Firm* — Alston & Bird LLP

(57) ABSTRACT

A system and method are presented to improve the speed of shared network processing by filtering data using a filter list. The filter list filters the data submitted for analysis to the server system. Some data is processed locally, but the filtered data is processed at the server system. The local systems process similar data, but they use distinct data hierarchies to classify the data. Hierarchy designations are utilized in the filter list to filter the data. Rules establish a unified hierarchy that is translated to local hierarchies in the filter lists. Tags are established at the server for exceptions. Tags are translated into data identifiers for inclusion in the filter lists. The size of the filter list is reduced by avoiding redundancies between the tagged data identifiers and the local hierarchy designations. The filter list creation process also creates pre-analysis data at the server to assist in its analysis.

20 Claims, 18 Drawing Sheets

(51) Int. Cl.
*G06F 16/242* (2019.01)
*G06F 16/38* (2019.01)
*G06F 16/81* (2019.01)
*G06F 16/9536* (2019.01)
*G06F 16/2455* (2019.01)

(52) U.S. Cl.
CPC .......... *G06F 16/81* (2019.01); *G06F 16/9536* (2019.01); *G06F 16/24564* (2019.01)

(58) Field of Classification Search
CPC .............. G06F 16/9536; G06F 3/0482; G06Q 30/0201; G06Q 30/0207; G06Q 30/0241; G06Q 30/06
See application file for complete search history.

(56) References Cited

U.S. PATENT DOCUMENTS

| | | | |
|---|---|---|---|
| 6,937,995 | B1 | 8/2005 | Kepecs |
| 7,111,780 | B2 | 9/2006 | Broussard et al. |
| 7,263,515 | B1* | 8/2007 | Tenorio ................. G06Q 30/02 |
| 7,784,683 | B1 | 8/2010 | Segura |
| 7,877,289 | B1 | 1/2011 | Cunningham et al. |
| 7,904,333 | B1 | 3/2011 | Perkowski |
| 8,321,302 | B2 | 11/2012 | Bauer et al. |
| 8,498,898 | B1 | 7/2013 | Kogen et al. |
| 9,864,988 | B2 | 1/2018 | Taylor et al. |
| 10,387,851 | B1 | 8/2019 | Krajicek et al. |
| 11,030,701 | B1 | 6/2021 | Brannan et al. |
| 11,334,680 | B1* | 5/2022 | Knox .................... G06F 21/602 |
| 2002/0040321 | A1 | 4/2002 | Nicholson |
| 2002/0046116 | A1 | 4/2002 | Hohle et al. |
| 2002/0049631 | A1 | 4/2002 | Williams |
| 2002/0100808 | A1 | 8/2002 | Norwood et al. |
| 2003/0046116 | A1 | 3/2003 | Horowitz et al. |
| 2003/0069839 | A1 | 4/2003 | Whittington et al. |
| 2003/0200144 | A1 | 10/2003 | Antonucci et al. |
| 2003/0212595 | A1 | 11/2003 | Antonucci |
| 2003/0216967 | A1 | 11/2003 | Williams |
| 2004/0046116 | A1 | 3/2004 | Schroeder et al. |
| 2004/0054590 | A1 | 3/2004 | Redford et al. |
| 2004/0140361 | A1 | 7/2004 | Paul et al. |
| 2004/0148203 | A1 | 7/2004 | Whitaker et al. |
| 2005/0071222 | A1 | 3/2005 | Bigus et al. |
| 2005/0071225 | A1 | 3/2005 | Bortolin et al. |
| 2005/0261968 | A1 | 11/2005 | Randall et al. |
| 2005/0278216 | A1 | 12/2005 | Graves |
| 2006/0015402 | A1 | 1/2006 | Graves et al. |
| 2006/0053056 | A1 | 3/2006 | Alspach-Goss et al. |
| 2006/0074784 | A1 | 4/2006 | Brown |
| 2006/0095328 | A1 | 5/2006 | Ross et al. |
| 2006/0113374 | A1 | 6/2006 | Taylor et al. |
| 2006/0113376 | A1 | 6/2006 | Reed et al. |
| 2006/0122855 | A1 | 6/2006 | Prorock |
| 2006/0206435 | A1 | 9/2006 | Hoblit et al. |
| 2007/0011044 | A1 | 1/2007 | Hansen |
| 2007/0156531 | A1 | 7/2007 | Schuller et al. |
| 2007/0164106 | A1 | 7/2007 | Mcdevitt et al. |
| 2007/0175985 | A1 | 8/2007 | Barnes et al. |
| 2007/0185803 | A1 | 8/2007 | Harrison et al. |
| 2007/0244745 | A1 | 10/2007 | Boal |
| 2007/0244811 | A1 | 10/2007 | Tumminaro |
| 2007/0288313 | A1 | 12/2007 | Brodson et al. |
| 2008/0033880 | A1 | 2/2008 | Fiebiger et al. |
| 2008/0059306 | A1 | 3/2008 | Fordyce et al. |
| 2008/0077498 | A1 | 3/2008 | Ariff et al. |
| 2008/0097844 | A1 | 4/2008 | Hsu et al. |
| 2008/0210753 | A1 | 9/2008 | Plozay et al. |
| 2009/0018860 | A1 | 1/2009 | Sikes et al. |
| 2009/0070251 | A1 | 3/2009 | Gonen et al. |
| 2009/0099929 | A1 | 4/2009 | Thibedeau et al. |
| 2009/0150234 | A1 | 6/2009 | Darst et al. |
| 2009/0259589 | A1 | 10/2009 | Agostino et al. |
| 2010/0010901 | A1 | 1/2010 | Marshall et al. |
| 2010/0057554 | A1 | 3/2010 | Lanford |
| 2010/0057611 | A1 | 3/2010 | Antoo et al. |
| 2010/0088207 | A1 | 4/2010 | Mclaughlin et al. |
| 2010/0094733 | A1 | 4/2010 | Shapira et al. |
| 2010/0100484 | A1 | 4/2010 | Nguyen et al. |
| 2010/0131342 | A1 | 5/2010 | Thibedeau et al. |
| 2010/0274659 | A1 | 10/2010 | Antonucci et al. |
| 2010/0318372 | A1 | 12/2010 | Band et al. |
| 2011/0015980 | A1 | 1/2011 | Li |
| 2011/0078011 | A1 | 3/2011 | Senghore et al. |
| 2011/0087592 | A1 | 4/2011 | Van et al. |
| 2011/0239044 | A1 | 9/2011 | Kumar et al. |
| 2011/0288918 | A1 | 11/2011 | Cervenka et al. |
| 2011/0302020 | A1 | 12/2011 | Ariff et al. |
| 2012/0012648 | A1 | 1/2012 | Collins et al. |
| 2012/0016730 | A1 | 1/2012 | Antonucci et al. |
| 2012/0030002 | A1 | 2/2012 | Bous et al. |
| 2012/0066049 | A1 | 3/2012 | Muthugopalakrishnan et al. |
| 2012/0123847 | A1 | 5/2012 | Wane et al. |
| 2012/0136706 | A1 | 5/2012 | Chang et al. |
| 2012/0150553 | A1 | 6/2012 | Wade |
| 2012/0150668 | A1 | 6/2012 | Wade |
| 2012/0150694 | A1 | 6/2012 | Wade |
| 2012/0150697 | A1 | 6/2012 | Wade |
| 2012/0150746 | A1 | 6/2012 | Graham |
| 2012/0159746 | A1 | 6/2012 | Matsumoto |
| 2012/0221468 | A1 | 8/2012 | Kumnick et al. |
| 2012/0226534 | A1 | 9/2012 | Aloni et al. |
| 2012/0233074 | A1 | 9/2012 | Dangott et al. |
| 2012/0259742 | A1* | 10/2012 | Ochiai ............... G06Q 30/0603 705/27.1 |
| 2012/0310722 | A1 | 12/2012 | Baron et al. |
| 2013/0103473 | A1 | 4/2013 | Carpenter et al. |
| 2013/0110604 | A1 | 5/2013 | Rooke et al. |
| 2013/0124429 | A1 | 5/2013 | Zou et al. |
| 2013/0179250 | A1 | 7/2013 | Nguyen et al. |
| 2013/0246094 | A1 | 9/2013 | Cruise |
| 2013/0262249 | A1 | 10/2013 | Beyer et al. |
| 2013/0338167 | A1 | 12/2013 | Cai et al. |
| 2013/0339167 | A1 | 12/2013 | Taylor et al. |
| 2013/0339238 | A1 | 12/2013 | Unland et al. |
| 2014/0006126 | A1 | 1/2014 | Mysen et al. |
| 2014/0019171 | A1 | 1/2014 | Koziol |
| 2014/0052459 | A1 | 2/2014 | Grossman et al. |
| 2014/0188644 | A1 | 7/2014 | Postrel |
| 2014/0214567 | A1 | 7/2014 | Llach et al. |
| 2014/0324482 | A1 | 10/2014 | Wallach |
| 2015/0120418 | A1 | 4/2015 | Cervenka et al. |
| 2016/0078431 | A1* | 3/2016 | Ramachandran .. G06Q 30/0605 705/64 |
| 2016/0148244 | A1 | 5/2016 | Nordstrand et al. |
| 2016/0314531 | A1 | 10/2016 | Dangott et al. |
| 2017/0076348 | A1 | 3/2017 | Jennings et al. |
| 2020/0142930 | A1* | 5/2020 | Wang ................ G06F 18/23213 |
| 2020/0151754 | A1 | 5/2020 | Nordstrand et al. |
| 2020/0151755 | A1 | 5/2020 | Nordstrand et al. |
| 2020/0286117 | A1 | 9/2020 | Nordstrand et al. |
| 2020/0286118 | A1 | 9/2020 | Nordstrand et al. |
| 2020/0302471 | A1 | 9/2020 | Nordstrand et al. |
| 2020/0302472 | A1 | 9/2020 | Nordstrand et al. |
| 2020/0311751 | A1 | 10/2020 | Shi et al. |
| 2022/0044274 | A1 | 2/2022 | Nordstrand et al. |
| 2023/0055163 | A1* | 2/2023 | McCreight .......... G06F 16/2474 |

OTHER PUBLICATIONS

Final Office Action for U.S. Appl. No. 14/173,385, dated Dec. 11, 2014, (39 pages), United States Patent and Trademark Office, US.
Final Office Action for U.S. Appl. No. 14/173,385, dated Jun. 2, 2017, (26 pages), United States Patent and Trademark Office, US.
Final Office Action for U.S. Appl. No. 14/262,149, dated Aug. 19, 2015, (30 pages), United States Patent and Trademark Office, US.
Final Office Action for U.S. Appl. No. 14/262,149, dated Mar. 9, 2018, (41 pages), United States Patent and Trademark Office, US.
Final Office Action for U.S. Appl. No. 14/262,344, dated Jul. 8, 2015, (24 pages), United States Patent and Trademark Office, US.
Final Office Action for U.S. Appl. No. 15/008,787, dated Mar. 4, 2019, (36 pages), United States Patent and Trademark Office, US.

(56) References Cited

OTHER PUBLICATIONS

Final Office Action for U.S. Appl. No. 17/961,162, dated Nov. 15, 1012, (28 pages), United States Patent and Trademark Office, US.
Houtan, Bahar et al. "A Survey On Blockchain-Based Self-Sovereign Patient Identity In Healthcare," IEEE Access, vol. 8, May 12, 2020, (Year:2020), pp. 90478-90494.
IP.com. "Closed Loop Business Process for Targeted Offers—An IP.com Prior /art Database Technical Disclosure," (5 pages), IPCOM000153072D, Original Publication Date: May 23, 2007.
NonFinal Office Action for U.S. Appl. No. 13/446,743, dated Nov. 20, 2013, (13 pages), United States Patent and Trademark Office, US.
NonFinal Office Action for U.S. Appl. No. 13/835,372, dated Jan. 13, 2016, (30 pages), United States Patent and Trademark Office, US.
NonFinal Office Action for U.S. Appl. No. 14/173,360, dated Oct. 14, 2014, (16 pages), United States Patent and Trademark Office, US.
NonFinal Office Action for U.S. Appl. No. 14/173,385, dated Aug. 16, 2016, (31 pages), United States Patent and Trademark Office, US.
NonFinal Office Action for U.S. Appl. No. 14/173,385, dated Jul. 11, 2014, (28 pages), United States Patent and Trademark Office, US.
NonFinal Office Action for U.S. Appl. No. 14/262,149, dated Aug. 28, 2017, (36 pages), United States Patent and Trademark Office, US.
NonFinal Office Action for U.S. Appl. No. 14/262,149, dated Oct. 2, 2014, (21 pages), United States Patent and Trademark Office, US.
NonFinal Office Action for U.S. Appl. No. 14/262,344, dated Sep. 11, 2014, (21 pages), United States Patent and Trademark Office, US.
NonFinal Office Action for U.S. Appl. No. 14/715,264, dated Feb. 16, 2018, (24 pages), United States Patent and Trademark Office, US.
NonFinal Office Action for U.S. Appl. No. 14/939,158, dated Feb. 6, 2019, (20 pages), United States Patent and Trademark Office, US.
NonFinal Office Action for U.S. Appl. No. 15/008,787, dated Feb. 14, 2017, (35 pages), United States Patent and Trademark Office, US.
NonFinal Office Action for U.S. Appl. No. 15/726,455, dated Dec. 14, 2017, (36 pages), United States Patent and Trademark Office, US.
NonFinal Office Action for U.S. Appl. No. 15/834,176, dated Aug. 8, 2019, (23 pages), United States Patent and Trademark Office, US.
NonFinal Office Action for U.S. Appl. No. 16/746,883, dated Dec. 10, 2020, (7 pages), United States Patent and Trademark Office, US.
NonFinal Office Action for U.S. Appl. No. 16/746,884, dated Dec. 21, 2020, (6 pages), United States Patent and Trademark Office, US.
NonFinal Office Action for U.S. Appl. No. 16/776,752, dated Jan. 14, 2022, (27 pages), United States Patent and Trademark Office, US.
NonFinal Office Action for U.S. Appl. No. 16/881,655, dated Jun. 24, 2021, (26 pages), United States Patent and Trademark Office, US.
NonFinal Office Action for U.S. Appl. No. 16/882,493, dated Aug. 11, 2021, (11 pages), United States Patent and Trademark Office, US.
NonFinal Office Action for U.S. Appl. No. 16/895,913, dated Jun. 9, 2021, (8 pages), United States Patent and Trademark Office, US.
NonFinal Office Action for U.S. Appl. No. 16/897,645, dated Jul. 16, 2021, (14 pages), United States Patent and Trademark Office, US.
NonFinal Office Action for U.S. Appl. No. 17/314,271, dated Oct. 14, 2022, (12 pages), United States Patent and Trademark Office, US.
NonFinal Office Action for U.S. Appl. No. 17/341,361, dated Aug. 31, 2023, (15 pages), United States Patent and Trademark Office, US.
Sarokin, David et al. "Health Care Viewed Through The Lens Of Information," MIT Press, pp. 45-72, Copyright Year: 2016 (Year: 2016), ISBN: 9780262336253.
Zolotaryova, Iryna et al. "Example Of Developing A Loyalty Program Using CRM, SQL-Queries and Rapid Miner Tool," Proceedings of the Third International Conference on Modelling and Development of Intelligent Systems, Oct. 10-12, 2013, pp. 156-167, (12 pages), Lucian Blaga University, Sibiu, Romania.
Notice of Allowance and Fees Due (PTOL-85) Mailed on May 22, 2024 for U.S. Appl. No. 17/341,361, 17 page(s).
Non-Final Rejection Mailed on Aug. 21, 2024 for U.S. Appl. No. 17/314,271, 14 page(s).
Notice of Allowance and Fees Due (PTOL-85) Mailed on Dec. 10, 2024 for U.S. Appl. No. 17/314,271, 10 page(s).

\* cited by examiner

Fig. 2
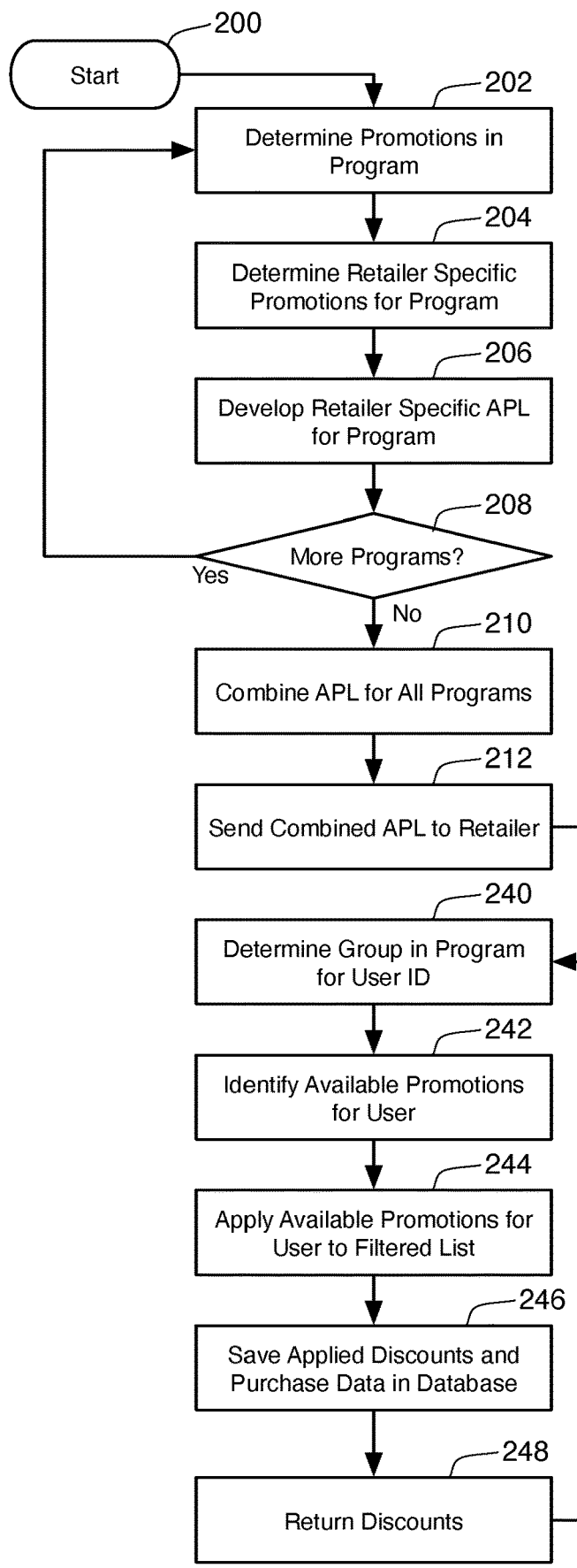
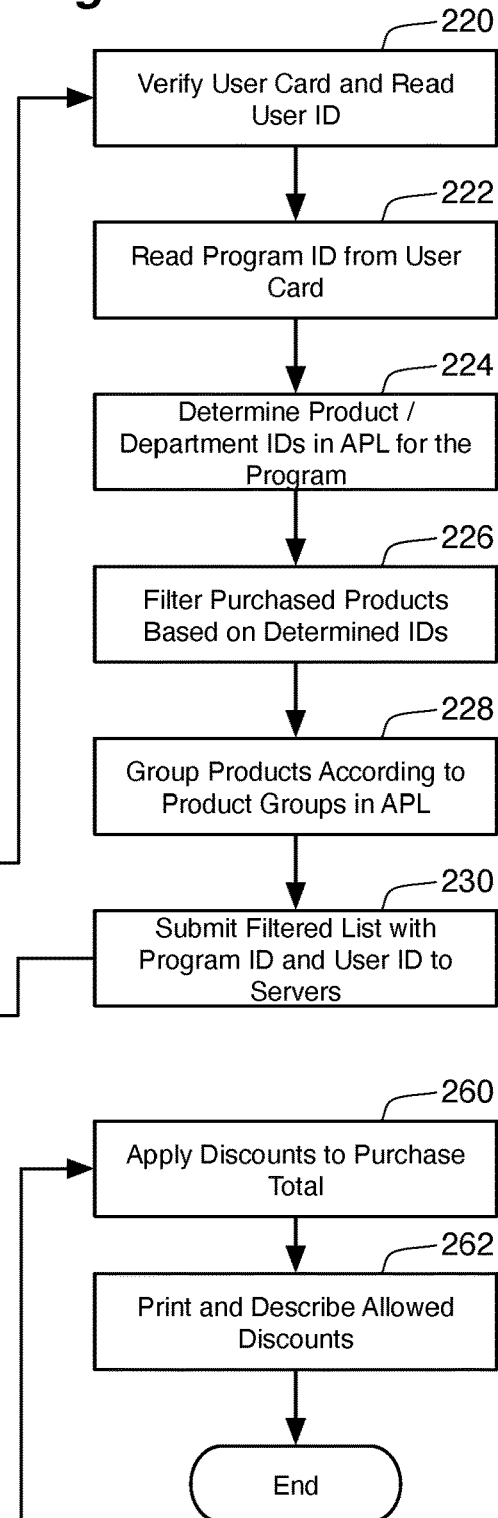

Fig. 3

| S3 APL Header Record | | | | |
|---|---|---|---|---|
| Data Element | Format | Position | Condition | Comments |
| Record Type | PIC X(1) | 1 | M | "H" – Header, D – Detail, or T - Trailer |
| Record Sequence # | PIC 9(6) | 2-7 | M | Always "000000" |
| APL Version Number | PIC 9(6) | 8-13 | M | 3-digit Julian Date and 3-digit sequence number |
| Process Date-Time | PIC X(12) | 14-25 | M | Format – YYMMDDHHMMSS |
| Total Record Count | PIC X(6) | 26-31 | M | Includes header, detail and trailer records |

| S3 APL Detail Record | | | | |
|---|---|---|---|---|
| Data Element | Format | Position | Condition | Comments |
| Record Type | PIC X(1) | 1 | M | "D" – Detail |
| Record Sequence # | PIC 9(6) | 2-7 | M | Increments by 1 for each product starting at "000001" |
| Program Code | PIC 9(3) | 8-10 | M | Program Codes are embedded in the card (track 2 data) and in the APL where the Program Code identifies a sub-set of products for the specified program. |
| Product Code Data (includes UPC/PLU data) | PIC 9(16) | 11-26 | M | • Product Code Type Indicator, PIC 9(1):<br>  0 – Universal Product Code (UPC) or Price Lookup Code (PLU)<br>  2 – Department - Configurable by retailer<br>• Product Code Value, PIC 9(15) |
| Product Group Code (new) | PIC X(6) | 27-32 | C | The Product Group Code is an alphanumeric value (starting with an alpha character as an identifier) and has a one-to-may relationship to products (UPCs/PLUs) which allows for multiple products to be consolidated into a single product record for discount authorization messaging. Not all products will be assigned a group code. |
| Type Code | PIC X(3) | 33-35 | C | The type code may be any combination of alphanumeric characters, and it only needs to be passed from point-of-sale to the host to support discount authorization processing. Not all products will be assigned a type code. |
| Authorization Type | PIC X(3) | 36-38 | M | Authorization-Type code dictates the substantiation level required for a given Program.<br>• APL – APL Only (standard basket substantiation; auth message not required)<br>• SOL – DEFAULT - Solutran S3 Host (enhanced substantiation) |
| Settlement Code | PIC X(3) | 39-41 | M | The Settlement Code dictates the appropriate settlement channel by Program ID.<br>• TPS – Third Party Settlement (pre-paid)<br>• SOL – DEFAULT - Solutran (Solutran managed settlement)<br>Online messaging rules may vary depending upon Auth-Type and Settlement Code. |
| Reserved for Future Use | PIC X(40) | 42-81 | M | Reserved for future use.... |

| S3 APL Trailer Record | | | | |
|---|---|---|---|---|
| Data Element | Format | Position | Condition | Comments |
| Record Type | PIC X(1) | 1 | M | "T" - Trailer |
| Total Record Count | PIC 9(6) | 2-7 | M | Includes header, detail and trailer records |

Figure 9

Retailer #1 Dept & Products List — 900

| Dept Numb. | Sub Dept. | Dept. Description |
|---|---|---|
| Dept #1 | | Food |
| Dept #1 | a | Groceries |
| Dept #1 | b | Candy |
| Dept #2 | | Health |
| Dept #3 | | Cigarettes |
| Dept #4 | | Alcohol |

| Prod ID | Dept | Sub-Dept. | Prod Descr. |
|---|---|---|---|
| 1234 | #1 | b | XG Candy Bar |
| 1235 | #1 | a | Sugar Cookies |
| 1236 | #1 | a | Pea Soup |

Figure 10

Retailer #2 Dept & Products List — 1000

| Dept Numb. | Sub. | Description |
|---|---|---|
| Dept #58 | | Groceries |
| Dept #58 | b | Packaged Goods |
| Dept #58 | c | Canned Goods |
| Dept #16 | | Health |
| Dept #72 | | Candy and Snacks |

| Prod ID | Dept | Sub-Dept. | Prod Descr. |
|---|---|---|---|
| 1234 | #72 | | XG Candy Bar |
| 1235 | #72 | | Sugar Cookies |
| 1236 | #58 | c | Pea Soup |

Figure 11

Mapping Rules for First Retailer (R1) — 822

| | 1110 | 1120 | 1130 | | |
|---|---|---|---|---|---|
| Banner ID (Retailer) | 1 | 1 | 1 | 1 | 1 |
| Banner Name | Acme Store | Acme Store | Acme Store | Acme Store | Acme Store |
| Dept # | 1 | 1 | 1 | 2 | 3 |
| Dept. Name | Food | Food | Food | Health | Cigarettes |
| Sub-Dept # | ALL | a | b | ALL | ALL |
| Sub-Dept. Name | | Groceries | Candy | | |
| Unified Dept # | 2 | 2 | 17 | 1 | 7 |
| Unified Dept. Name | Groceries | Groceries | Candy | Health & Beauty | Tobacco |
| Unified SubDept. | | b | | a | a |
| U. SubDept. Name | | General | | Health Products | Cigarettes |
| Tag #1 | Tag A | Tag A | Tag B | Tag F | Tag K |
| Tag #2 | | Tag G | | Tag J | Tag F |

Figure 12

Key-Word Level Rules for First Retailer — 832

| | 1210 | 1220 |
|---|---|---|
| Banner ID | 1 | 1 |
| Dept # | 1 | 1 |
| Sub-Dept # | a | a |
| Key Text | Cookie | Cupcake |
| Unified Dept # | 2 | 2 |
| Unified SubDept # | f | f |
| Tag #1 | Tag B | Tag B |

Figure 13

Item Identifier Rules for First Retailer — 840

| | 1300 |
|---|---|
| Item ID | 2814 |
| Unified Dept # | 2 |
| Unified SubDept # | f |
| Tag #1 | Tag B |

Figure 14

Custom Rule for First Retailer — 850

| | 1400 |
|---|---|
| Rule | SNAP flag is set |
| Unified Dept # | |
| Unified SubDept # | |
| Tag #1 | Tag S |

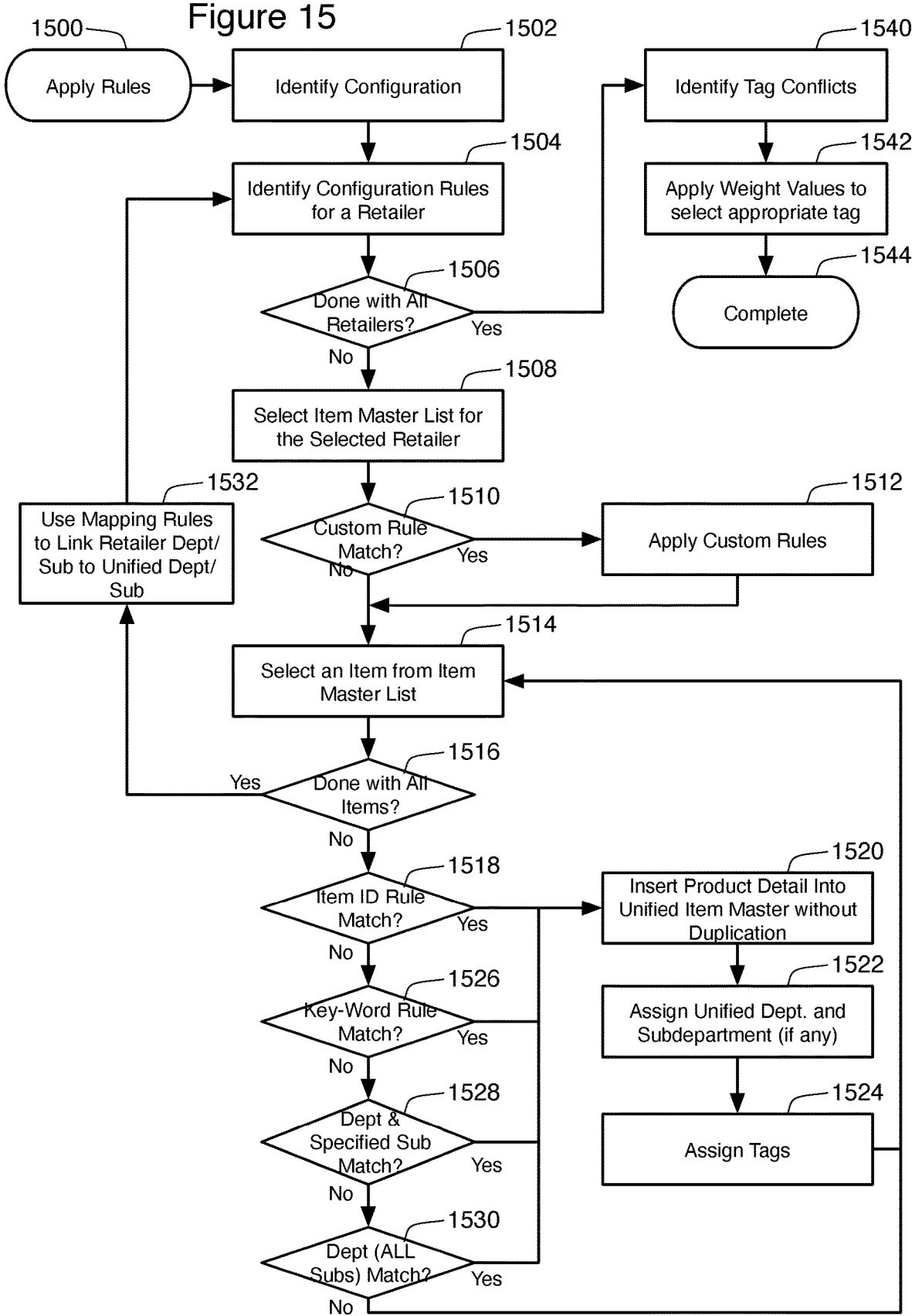

Figure 16

| Dept Numb. | Sub Dept | Dept. Description |
|---|---|---|
| Dept #1 | | Food |
| Dept #1 | a | Groceries |
| Dept #1 | b | Candy |
| Dept #2 | | Health |
| Dept #3 | | Cigarettes |

902

| U.Dept | U Sub |
|---|---|
| 2-Groceries | |
| 2-Groceries | a-General |
| 17-Candy | |
| 1-Health & Beauty | a-Heatlh |
| 7-Tobacco | a-Cigarettes |

750

| Prod ID | Dept | Sub-Dept. | Prod Descr. |
|---|---|---|---|
| 1234 | #1 | b | XG Candy Bar |
| 1235 | #1 | a | Sugar Cookies |
| 1236 | #1 | a | Pea Soup |

904

| U. Dept | U Sub | Tag |
|---|---|---|
| 17-Candy | | B, S |
| 2-Goceries | f | B, S |
| 2-Groceries | a-General | A, G, S |

1604

DATA TRANSMISSION FILTERING THROUGH A CUSTOMIZED FILTER LIST

CROSS-REFERENCE TO RELATED CASES

This application claims the benefit of U.S. Provisional Patent Application No. 63/293,720, filed Dec. 24, 2021. The application is also related to U.S. patent application Ser. No. 15/008,787 (now U.S. Pat. No. 10,552,861), filed Jan. 28, 2016, which was a continuation-in-part of U.S. patent application Ser. No. 14/262,149 (now abandoned), filed Apr. 25, 2014, which was a continuation-in-part of U.S. patent application Ser. No. 13/835,372 (abandoned), filed Mar. 15, 2013, which claimed the benefit of U.S. Provisional Patent Application Ser. No. 61/763,462), filed Feb. 11, 2013. The priority provisional application and the other related applications are all incorporated by reference into this application in their entireties.

FIELD OF THE INVENTION

The present application relates to the field of filtering data transmission. More particularly, the described embodiments relate to a system and method for improving the speed and efficiency of data communications processing through a network connection through customized data filtering. The embodiments filter data using a filter list suitable for exception analysis, where the filter list is customized for a local system and then used by the local system to submit data for analysis to the server system.

BRIEF DESCRIPTION OF THE DRAWINGS

FIG. 2 is a flow chart showing a method to perform one embodiment of the present invention.

FIG. 3 is a table showing the components of an approved product list.

FIG. 9 is a chart view of a portion of a data set received from a first environment.

FIG. 10 is a chart view of a portion of a data set received from a second environment.

FIG. 11 is a chart view of a first type of rules from FIG. 8.

FIG. 12 is a chart view of a second type of rules from FIG. 8.

FIG. 13 is a chart view of a third type of rules from FIG. 8.

FIG. 14 is a chart view of a fourth type of rules from FIG. 8.

FIG. 15 is a flow chart for a method of applying the rules from FIG. 8.

FIG. 16 is a chart view of a portion of the data from FIG. 9 after the method of FIG. 15.

DETAILED DESCRIPTION

Filtering Date Through a Filter List

Figure 1:
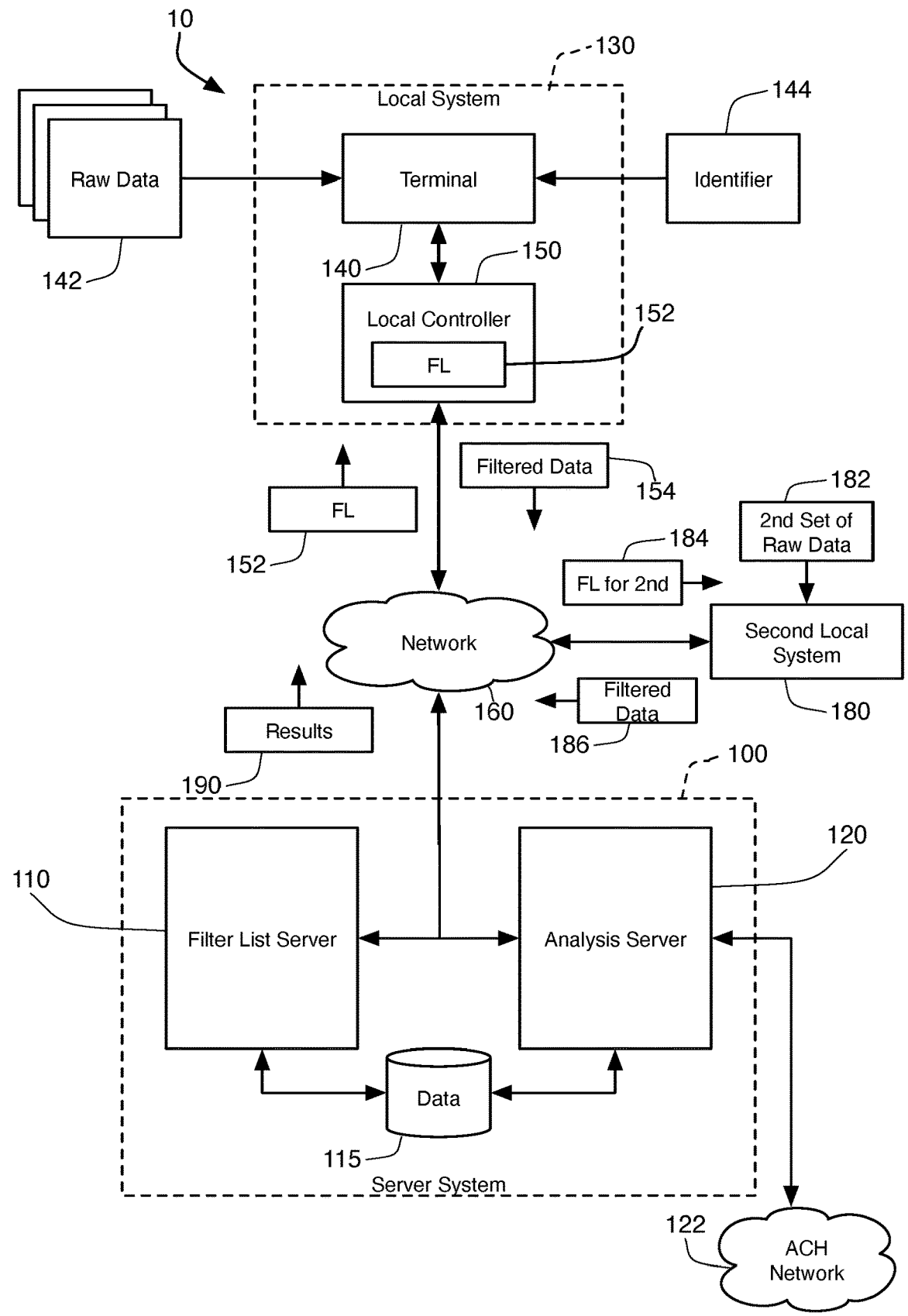
FIG. 1 is a system diagram showing the primary components of one embodiment of the present invention.

As shown in FIG. 1, an improved system 10 for handling, filtering, and processing of data is presented. In this Figure, a local system 130 generates or gathers raw data 142. This local system 130 may contain component elements, such as a terminal 140 that receives or generates this data 142 and a local controller 150 that analyzes and processes this data 142. The received data 142 may be associated with an identifier 144 that identifies a person or an entity associated with the data 142. While the local controller 150 is capable of processing this data 142 in part, additional processing of this data 142 must be accomplished at a server system 100 that is accessed over a network 160

More particularly an analysis server 120 portion of the server system 100 is responsible for analyzing the data that is received from the local system 130. The analysis server 120 also reports back the results 190 of this analysis back to the local system 130. In at least one embodiment, the data received by the server system 100 is not the entirety of the raw data 142 being analyzed by the local system 130. Instead, the raw data 142 is filtered by the local controller 150 before it is transmitted to the server system 100 over the network. What is transferred over the network 160 is filtered data 154, which constitutes only that portion of the raw data 142 that is required by the analysis server 120 to process the data 142.

The filtering that is performed by the local system 130 is governed by a filter list (or "FL") 152. The FL 152 is generated by the server system 100, transmitted over the network 160, and then received and stored by the local system 130 in order to appropriately filter the raw data 142 into the transmitted filtered data 154. Because of this context, the local system 130 can be considered the list recipient local system 130. The FL 152 is generated periodically by the server system 100 because of the changing nature of the processing that occurs at the server system 100. If the server system 100 handled only an unchanging analysis of the data 142, the filtering accomplished by the local controller 150 could similarly be unchanging and new FLs would never have to be received and implemented. However, the analysis being accomplished by the server system 100 is subject to routine changes. In fact, it is the changing aspect of such analysis that sometimes requires that the analysis be performed at the server system 100 rather than at the local system 130.

The filtering of the raw data 142 into the filtered data 154 leads to faster communications between the local system 130 and the server system 100 over the network 160 (because of less data), which prevents against a slowing down of the overall processing of the system 10. Alternatively, slower transmission speeds over the network 160 are possible when compared to systems where all the raw data 142 is transmitted because less data needs to be sent. Furthermore, the creation of this filtered list 154 reduces the processing required at the analysis server 120 (because of less data), further reducing the overall time required to process the raw data 142. Finally, the filtered list 154 decreases the amount of information about the raw data 142 that needs to be communicated from the local system 130 to the server system 100, which allows the local system 130 to maintain some level of confidentiality about the raw data 142. This confidentiality is important whenever some aspect of the raw data 142 contains private information, and the server system 100 is managed by an entity different than the entity that runs the local system.

In FIG. 1, the server system 100 uses an FL server 110 to generate the filter list 152 that is transmitted to the local system 130. The FL server 110 utilizes data 115 stored at the server system 100 in order to generate the FL 152 that is used to create the filtered data 154. As the raw data 142 needed by the analysis server 120 changes, this is identified by the FL server 110 and changes are made to the filter list 152 transmitted to the local system 130. Note that the functions of the FL server 110 and the analysis server 120 can be performed on the same physical computer system or can be performed on physically separated computers that together form part of the overall system 10.

The local system 130 identifies the raw data 142 and then compares it to the filter list 152 to generate the filtered data 154. In some instances, the identifier 144 that is associated with the raw data 142 will be used to select a portion of the filter list 152 to use while creating the filtered data 154. The identifier 144 can also be transmitted as part of the filtered data 154 for use by the analysis server 120 when analyzing the rest of the filtered data 154.

The server system 100 is designed to process data from a plurality of local systems similar to local system 130. In FIG. 1, a second local system 180 is shown that receives its own set of data 182. This data 182 is filtered according a different Filter List 184 that was specifically configured for the second local system 180. This second FL 184 is used to filter the second set of raw data 182 to generate the second set of filtered data 186 that is then transmitted over the network 160 to the server system 100 for processing.

While the processing performed by the analysis server 120 for the two local systems 130, 180 is similar, it is frequently the case that the data 142, 182 processed by these two systems 130, 180 is different. This difference results in the requirement that the FL Server 110 generate two different filter lists 152, 184 for these two systems 130, 180. Sometimes the two sets of data 142, 182 are similar, but they are organized differently by the two local systems 130, 180. In order for the filter lists 152, 184 to take advantage of any such internal organizations of the local systems 130, 180, the FL Server 110 will have to track these differences and reflect these differences in the generated FLs 152, 184. In other instances, some type of the data 142 that is received by local system 130 is never received by the second local system 180, therefore the FL 184 for this second local system 180 need not address this type of data.

Some aspects of this invention were originally developed in the context of purchased product data generated at a local retail system, so in this context this local data 142 may relate to a purchase transactions at a local retail system 130. This context is frequently described in the incorporated documents, where the filter list 152 is frequently referred to as an Approved Product List (or "APL") or a promotion product filter list (or "PPF list"). The incorporated documents provide detailed descriptions on the type of processing that can be accomplished using a server system 100 that receives filtered data 154 generated through the use of a filter list 152. This retail context is sometimes used in the description below as an example implementation to explain one embodiment of the present invention. The techniques and inventions described herein, however, are not limited to this retail embodiment.

In the retail environment, the analysis server 120 can examine a filtered list 154 of the products purchased 142 during a retail transaction. The analysis server 120 can, for example, analyze this filtered list of purchased products 154 for the purpose of promotion processing. The analysis server 120, functioning as a promotion analysis server, examines the products purchased in the filtered list 152, examines the database 115 to determine which promotions are relevant to those products identified in filtered list 154 and have benefits that are available for an identified user (identified through identifier 144). If benefits remain, the analysis server 120 will apply the applicable promotions to the filtered product list 154. The calculated discounts can be used to update the available benefits in the database 115, and are then transmitted over the network 160 to the local system 130. The terminal 140 could then apply the calculated discounts to the purchase price of the products 142 represented by data 142. The server system 100 can then debit accounts owned by the sponsors of the promotions, and credit the account of the retailer that owns the local system 130. In one embodiment, either or both of the credit and debit transactions can take place over the ACH network 122 accessed by the server system 100.

Example Method in a Retail Context

FIG. 2 shows a method 200 that can be used to manage promotions and programs using system 10. A promotion generally takes the form of a discount on an item. Some example promotions that can be supported by the system 10 include:

1) a money-off discount, such as $1.00 off a particular product;
2) a percentage-off discount, such as 20% off of any product sold under a common brand;
3) a final price discount where the discount provides the final price to be paid (2 items for $5.00, or $1.99 per pound) as opposed to a specified percentage or money-off discount; or
4) a stored value benefit for a particular category or product group.

A program is a set of promotions provided to users. For example, an employer may encourage employees to eat more healthily by creating a program with a variety of promotions on healthy foods. The employer can fund some of these promotions, and then seek partners to pay for others of the promotions in the program (or the administrator of the system 100 could assist in finding partners). A health food brand may agree to pay for a 5% discount on all of their products, while a vitamin brand may agree to provide $1 off any purchase of at least $10 of their vitamins. The employer would provide a card for this promotion to their employees that they can use at a variety of retail stores. While the card is accepted and redeemable at many different retailers, the employer may be able to convince one or more of the retailers to add their own promotion to the program. One of the primary benefits of defining a program in this way is that the program need not be static, as changes made to the promotions that constitute a program are easily communicated through the entire system 10. The means that the employer could change, add, or remove promotions within their program with very little effort. A fuller description of programs is provided below in connection with FIG. 6.

Filter lists 152, which can be referred to as approved product lists 152, are generated on a retailer-by-retailer basis. This means that in order to generate an APL 152 in method 200, the APL server 110 must identify all of the general promotions that make up a program in step 202, and then identify in step 204 any retailer-specific promotions that the retailer receiving this APL 152 has agreed to add to the program. Once all the general and retailer-specific promotions are identified for a program, the APL server 110 will generate a list of products that are covered by these promotions. The product list will include the products that are being discounted by these promotions, as well as tie-in products that may need to be purchased before a tie-in promotion is available for redemption. The product list may include departments for department level promotions.

Each of these types of listings are considered "include" listings because products and departments listed in this matter are "included" in the promotion. Products and departments can also be "excluded" from a promotion. A promotion, for example, may provide a monthly value amount for the purchase of all food items except particularly unhealthy foods. This listing for this promotion would include all food items (by including one or more retailer departments that incorporate food items), but then excluding particular unhealthy foods such as candy or sugared soda (by excluding sub-departments or particular product codes that do not form part of the promotion). Another promotion may be sponsored by a government after a disaster and allow for the purchase of any item at a retailer other than tobacco, alcohol, and firearms. This promotion would include all items but exclude departments or sub-departments for that retailer related to any of these three exclusions.

This list of products and departments is the approved product list 152 for that program, and is created in step 206. In the preferred embodiment, the server system 100 can handle a plurality of programs created by a plurality of program sponsors. If additional approved product lists need to be created for additional programs, as determined by step 208, the method returns to step 202 for the next program. If the lists of products for all relevant programs have been created, then these lists are combined in step 210 into a single APL and sent to the retailer store system 130 in step 212. Because this combined APL includes products covered by retailer specific promotions in the programs, and because the APL utilizes department and sub-department classifications that differ between retailers, different APLs will be sent out to different retailers. More detail on the content and format of an APL is described below in connection with FIG. 3.

Step 220 is shown on the right side of FIG. 2, as are steps 222-230 and steps 260-262. This indicates that in at least one embodiment of the present invention, these steps 220-230, 260-262 take place on the local (or retail store) system 130. Steps 202-212 and 240-248 are on the left side of FIG. 2, and in this embodiment are performed on the server system 100. At step 220, the terminal 140 reads a user identifier/identification card 144. In some embodiments, the terminal 140 will verify that the card 144 is valid, such as by comparing expiration data found on the card 144 with the current date maintained by the terminal 140. Other types of validation are also possible.

In the preferred embodiment, the terminal 140 reads both a user identifier and a program identifier from the card 144. The program identifier may be a separate data element read from the card 144 or could form a portion of a single number encoded onto the card (such as digits 9-12 in a 20-digit card number). Alternatively, the program identifier could be determined by applying an algorithm to a number found on the card. The program identifier is read at step 222 and is used to identify at step 224 those products on the APL received by the local system 130 that are applicable to the program to which the user belongs. To speed up this product identification process, the APL could be formatted in a binary-keyed format. Alternatively, the APL could reside on the controller 150 in tagged data file or another ASCII format. At step 226, the terminal 140 examines the products 142 being purchased by the user, and then filters those products against the relevant product and department identifiers in the APL for the user's program. A primary lookup is performed based on a Universal Product Code (UPC) or Price Lookup Code (PLU) that identifies a particular product. In other words, if a user purchased wine, beer, and organic granola, and the promotions in the program only apply to the organic granola, the filtering step 226 allows only the product identifier for the granola through the filter. If the promotion applies to or excludes an entire department as opposed to a particular product, a secondary lookup is performed based on the indicated department number.

In some cases, the APL for a program may include product groups, which are explained in more detail below in connection with FIG. 4. If some of the products purchased by the user and filtered in step 226 are part of a product group in the APL, those products will be totaled together as a single item in the filtered list of products in step 228. This filtered list 154, including the user ID, is the submitted by the controller 150 over the network 160 to the analysis server 120. In some cases, the program ID may also be transmitted.

In other embodiments, the user may participate in a variety of programs. The user, for instance, may present two or more valid cards to the terminal 140, with each card representing a different program with different identifiers 144. The program IDs 144 from both cards will be read in step 222, and the product and department IDs in the APL relevant to both programs would be determined at step 224. The user identifier 144 might also be automatically associated at the local system 130 with multiple programs. Either way, the products purchased during a transaction would then be filtered in step 226 and grouped in step 228 based on the combined portions of the filter list 152 relevant to both programs. The filtered items would then be submitted along with the relevant program identifiers and/or user ID 144 in step 230. This submission may include the purchase price and/or quantity for the items purchased that made it through the filtering steps 226. The filtered list of products submitted by the retail system 130 to the server system 100 at step 230 can also transmit details about any discounts already provided on these products at the point of sale.

As described below in connection with FIG. 5, a particular program may be divided into user groups. If the program identified by identifier 144 is divided into user groups, the user identifier 144 received along with the filtered product list will be used by the analysis server 120 to identify which user group in the program is assigned to the user. This is done because some user groups in a program have specific promotions assigned to it that are not assigned to other user groups in the same program. Once the user group is identified in step 240, the promotions for members of that user group are determined (step 242). These promotions are then compared with items purchased by the user in this transaction, as indicated in the filtered list transmitted by the local system 130 in step 230.

It is here at the analysis server 120 that any exclusions related to the promotions are analyzed. As explained above, a promotion may provide a benefit for a particular set of products, but it may also specifically exclude some of those items. For example, a benefit may be applicable to an entire department of a retailer, but it may nonetheless exclude certain items even though they are included in that department. Alternatively, benefits may be excluded for an entire department, but nonetheless include certain items even though they are found in the excluded department. In both of these examples, the filter list 152 will include the department identifiers (whether the department is to be specifically included in the program or excluded) and the product identifiers for the particular products that are excluded (even though they are in an included department) or are included (even though they are in an excluded department). The analysis server 120 will see information about these departments and products included in the filtered data 154, identify the relevant promotions, and apply the includes and excludes appropriately to determine which purchases may be eligible for the benefit of a promotion.

Before discounts on the purchased products can be given, the database 115 must be referenced to determine whether or not the user has benefits available to him or her for the applicable promotions. The determination of benefits available to the user will also require the analysis server 120 to determine whether all of the requirements for a particular promotion have been met. For instance, a promotion may require that the user purchase $10 of an item before the 10% off discount is applicable. In other circumstances, the promotion may require the purchase of a tie-in product. The analysis of these requirements is also performed as part of step 242 of method 200.

At step 244, those promotions that are available to the user on the purchased products are then applied and discounts for each promotion are calculated. If more than one promotion applies to a particular product on the filtered product list, the analysis server 120 will use a consistent rule set to determine the order in which the promotion is applied. For instance, a percentage discount may be applied first, then a buy-one, get-one discount, and then a stored value credit would be applied. In another instance, the "purse" that pays for the benefit is analyzed and used to determine an order for which the discounts are applied.

The discounts applied are then saved in the database 115 at step 246, thereby updating the benefits available to the user for the next purchase transaction. At step 248, the server system 100 returns information about the applied discounts to the local system 130. At step 260, the store controller 150 or terminal 140 then applies the discounts to the purchase transaction and updates the total amount due for the purchase in step 260. Preferably, the discounts and how they were applied are then printed on the customer receipt in step 262. The method 200 will then end.

APL Contents

FIG. 3 shows the contents of an example filter list 152, in this case an approved product list (APL) for use in a retail environment, in the form of a table. The APL contains a plurality of records, starting with a header record and ending with a trailer record with a plurality of detail records in between. Each record consists of several fields that vary depending on the record type. The detail records contain the actual list of identifiers for parts of the raw data 142 to be included in the filtered data 154. In the retail context, the detail records identify products (using product identifiers) and retailer departments and subdepartments (using identifiers created by the retailer). These are described in more detail, although one of skill in the art could easily identify the contents and purposes of these detail fields as well as fields in the header and trailer records from the information provided in FIG. 3.

A detail record identifies itself as a detail record in the record type field and maintains a count of detail records in the record sequence field. Each detail record in a retail environment APL will identify a product or retailer department or subdepartment as belonging to a particular program. Consequently, each detail record contains a program code field to identify a program, and a product code data field to identify a particular product or department. As shown in FIG. 3, the first digit of the product code identifies whether the product code contains a universal product code (UPC) or Price Lookup Code (PLU) (when the first digit is a 0), or a department or subdepartment code (when the first digit is a 2). Each retailer uses different codes to identify their departments and subdepartments. For example, one retailer may identify fruits and vegetables as department 10010, apples as subdepartment 10011, and deli items as department 10020, while another retailer may use a different numbering scheme. This means that the server system 100 must have knowledge of the actual department numbering scheme used by the retailers that support the system 10 in order to provide department and subdepartment level promotions.

The product group code field, if used in a record, identifies a particular product as belonging to a product group. The product group code can be used to consolidate multiple different products into a single entry in the filtered list provided by the local system 130. This is described in more detail in connection with FIG. 4. The type code field identifies a particular product as belonging to a special select product type. The type code field is used to help the server system 100 apply special additional discounts and rewards. The type code is included with the filtered product list that is sent from the local system 130 to the server system 100. A single product may have both a product group code and a type code. The authorization type field allows for partial functionality of the server system 100 (such as substantiation only and no discount calculation at the server system 100). The settlement code field allows for communication from the server system 100 to the local system 130 concerning how payment for each discount will be handled.

Filtering Example

Figure 4A:
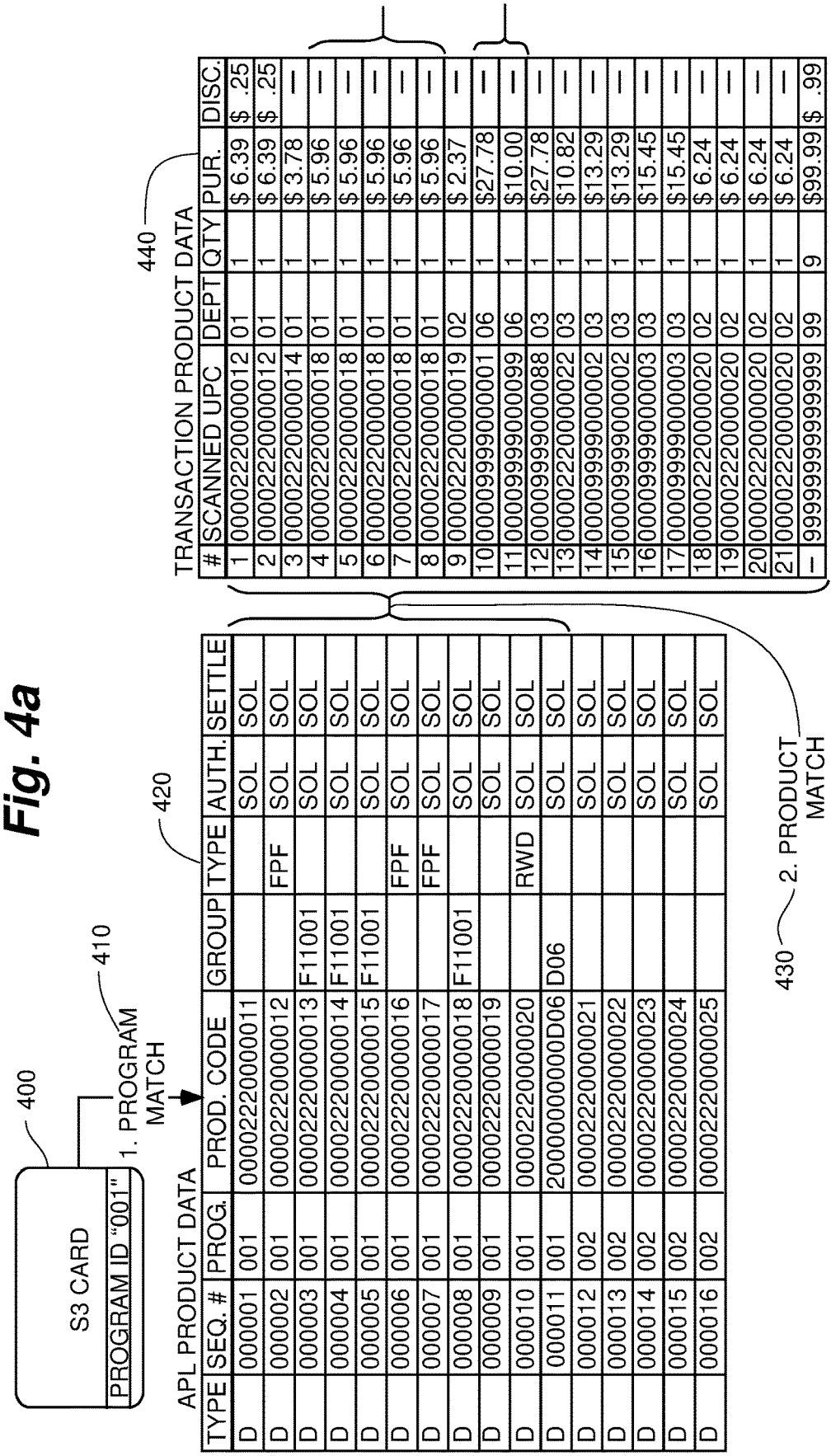
FIG. 4 (which is divided in sheet 4a and 4b in the Figures) is a schematic diagram showing the process of filtering purchased products using an approved product list and rolling up products within a group.
Figure 4B:
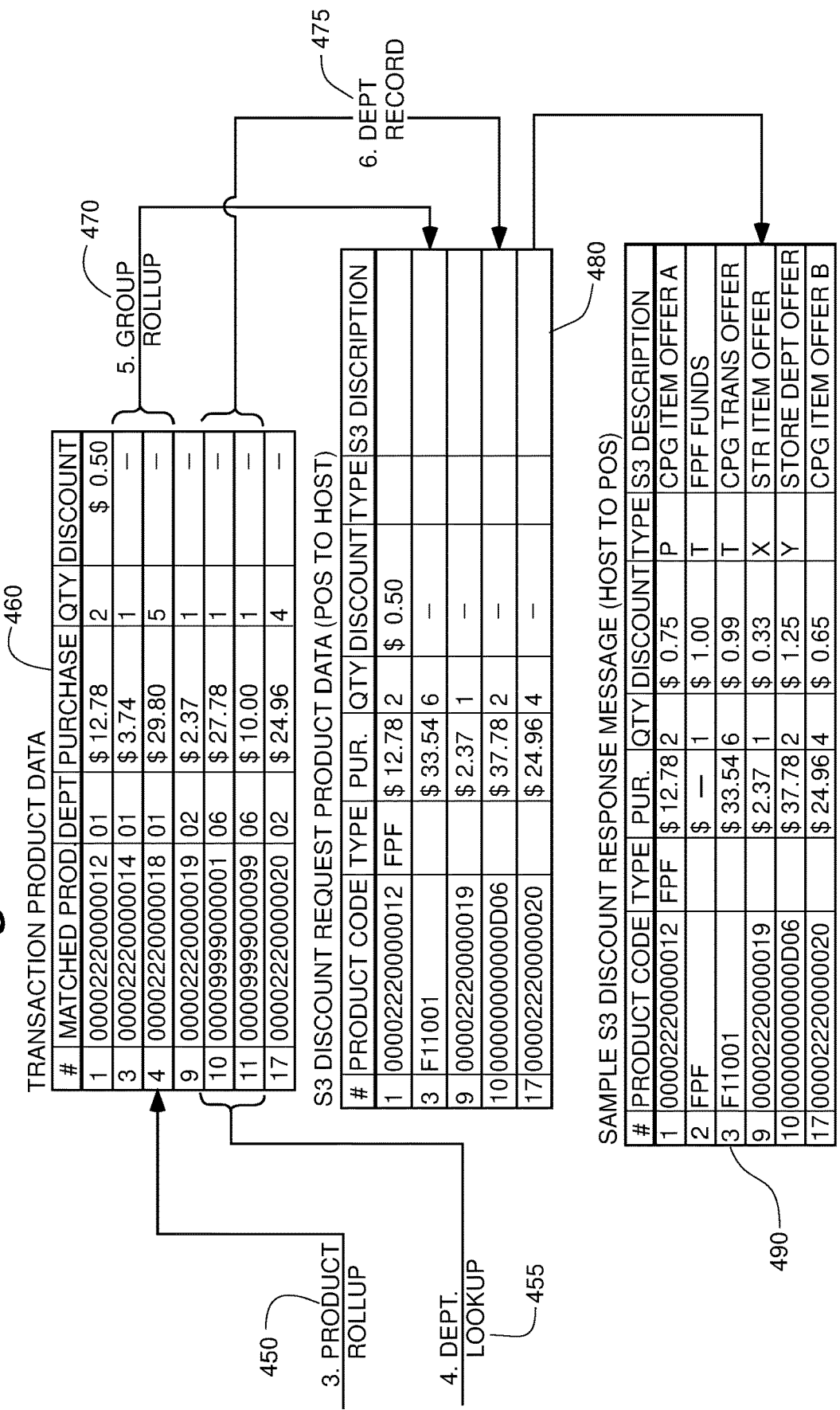

FIG. 4 provides an example how an approved product list 420 can be used to filter product purchase data 440 into a filtered product list 460 and eventually a filtered product list with group rollup 480. In this example, a user card 400 is presented that contains a program ID of "001". The APL 420 received by the local system 130 from the server system 100 is consulted to identify those data records that relate to this program 001. In FIG. 4, data records 000001 to 000011 relate to program 001, while data records 000011 to 000016 relate to program 002. The identification of relevant promotions in the APL 420 based on the program ID on the card 400 can be referred to as the program match, as indicated by arrow 410. Note that data records 000001-000010 relate to particular product UPC or PLU codes and not departments, as in each case the product code field starts with the numeral 0. Data record 000011 relates to a department code, because the product code field starts with the numeral 2. The department product code after the numeral 2 (and after the leading zeros) is "D06." This data record 000011 also designates the group code as D06. Four of the product codes are part of group F11001. In addition, three of the codes have a type code value of FPF and one has a type code value of RWD. The type code values FPF and RWD indicate that the corresponding products belong to a special select product group that may be eligible for special additional discounts. Although it is not shown in FIG. 4, subdepartments can also be identified in the APL 420 in a manner similar to that of departments. Note that the product and department identifiers in the APL 420 could be related to both include and include elements for a particular benefit, as is described in more detail below.

The eleven relevant promotions in the APL 420 are then used to filter all of the items purchased by the user. The scanned UPCs for purchased products 142 are shown in table 440, which includes a product identifier (UPC or PLU), a department code, a quantity, a purchase price, and a discount that has already been applied to this product by the terminal 140. These already-applied discounts are not related to promotions managed by system 10, and may include, for example, paper coupons presented by the user at the terminal 140. In step 430 the product codes of the relevant promotions in APL 420 are matched against the scanned product codes in transaction product data table 440. Product data filtering occurs at product-level filtering 450 and department-level filtering 455. The product-level filtering 450 matches scanned UPCs in table 440 to product codes in APL 420. The department-level filtering 455 matches a department code in table 440 to a department product code in APL 420. The resulting filtered product list 460 indicates those products that were purchased by the consumer for which promotions are being maintained by the system 10 for program 001. The list 460 includes not only the product identifiers, but also the department code, purchase price, purchase quantity, and the previously applied discounts. The process 450 includes rolling up multiple entries of a single product identifier in the transaction product data 440 into a single row of the filtered product list 460, which indicates the total quantity and price paid for all of the items.

Two of the products in the filtered products list 460 are part of group F11001. These group members are combined in group rollup step 470 and are then put into a single entry in discount request table 480, having the group identifier F11001 as the product code. In some embodiments, department rollup 475 that combine the filtered department 06 group members into a single entry in table 480 is also performed. The discount request table 480 contains a product or group code, a type code, a purchase price, a purchase quantity, and previously applied discounts. The discount request data table 480 comprises the filtered data 154 that is sent to the server system in step 230, described above.

In other embodiments, every department having a product that was included in the transaction product data 440 is rolled up to present a department purchase total regardless of the content of the APL 420. In these embodiments, even if just a single product purchase on the purchase data 440 matches a product identifier, department, or subdepartment on the APL 420, the non-zero total for every subdepartment and department will be rolled up and presented in the filtered data 154. When a match is found between the department or subdepartment code in the transaction data 440 and a department or subdepartment code in the APL 420, individual product details remain in the filtered data 480 presented to the server system 100. To ensure that the server system 100 can identify the departments and subdepartments of these now, individually listed products (and product totals), table 480 will include the department and subdepartment codes for each individually listed product identifier in the table 480.

Notably, the filtered product list 480 is the complete set of information that is shared with the server system 100. The transaction product data 440, containing a record of all products purchased in the transaction, is not passed to the server system 100. This is advantageous for retailers who wish to keep secret the valuable business analytic data that is obtained from customer transactions.

The server system 100 receives the table 480 and performs the processes described in connection with steps 240-248 in FIG. 2. The table 490 of FIG. 4 represents the data that the server system 100 sends back to the local system 130 in step 248. The discount response table includes the product or group code, a product type, the purchase price, the purchase quantity, a total discount, a discount type (P, T, X, or Y), and an abbreviated description of the discount applied. The "FPF" entry in the product code column of table 490 indicates that a special additional discount was applied. The retailer then uses these discounts to calculate the total price for the purchase.

The discount types X and Y represent discounts sponsored by the retailer processing the transaction. Discount types P and T refer to discounts sponsored by outside sources such as product manufacturers, employers, insurance companies, or other entities providing discounts. When calculating sales tax on a customer's purchase, the retailer-sponsored discounts X and Y are treated as a price reduction, but the outside discounts P and T are treated as tender. The X and Y discounts are not taxed, but the P and T discounts are taxed. In this way, the burden of determining taxable and non-taxable discounts is shifted from the retailer to the server system 100.

Computing Configuration and Database

Figure 5:
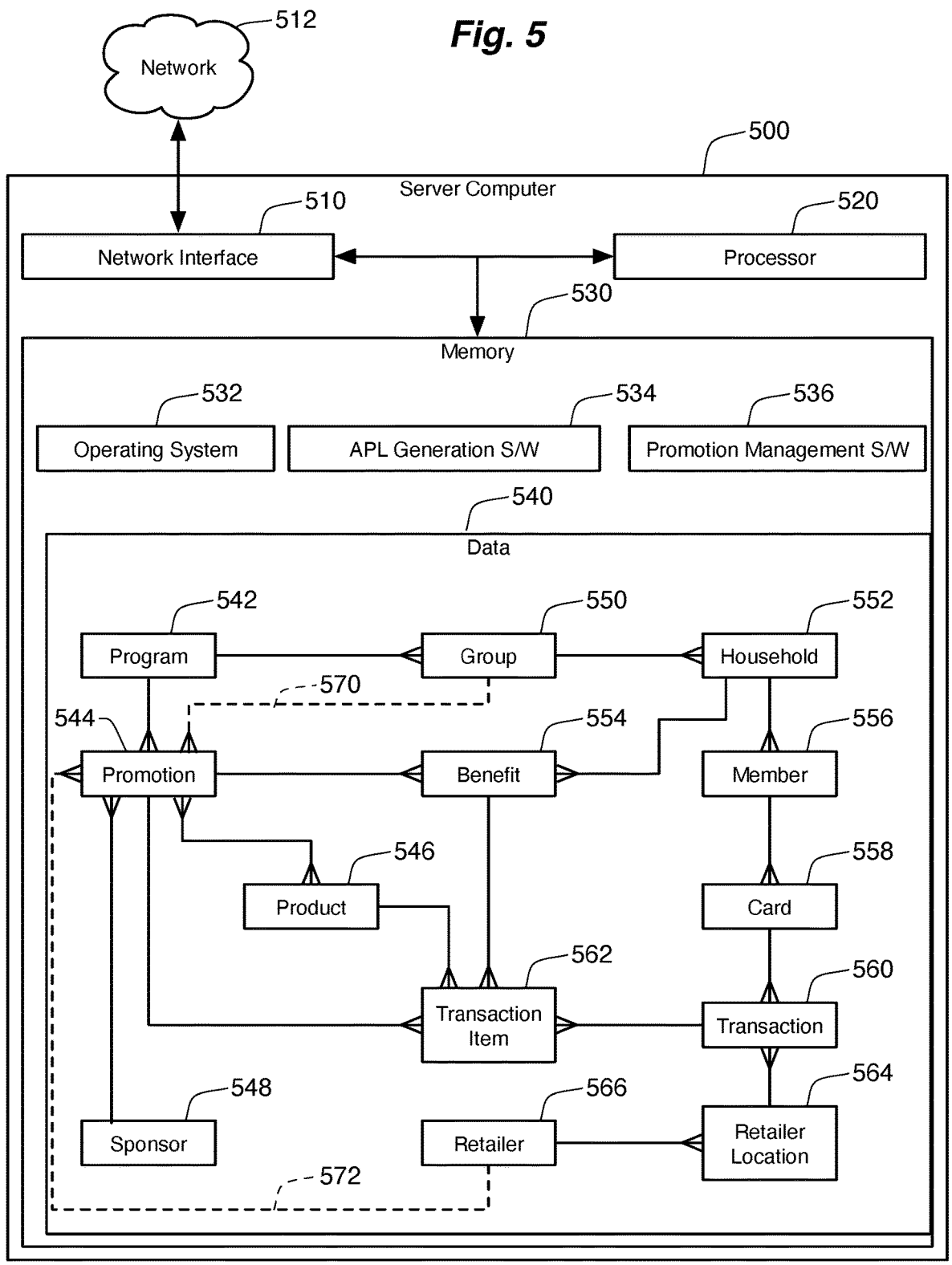
FIG. 5 is a system diagram showing the components of one embodiment of a server computer including the content of the data maintained by the server.

FIG. 5 shows an embodiment of the server system 100 in which a single server computer 500 operates as both the APL server 110 and the analysis server 120. The server computer 500 includes a network interface 510 designed to provide communications with remote devices over a network 512. In one embodiment, the network 512 is the Internet, and the network interface 510 includes TCP/IP protocol stacks for communicating over the network 512. The network interface 510 may connect to the network 512 wirelessly or through a physical wired connection. The server computer 500 further includes a programmable digital processor 520 designed to operate programming code stored on a memory 530. The processor 520 is preferably a general-purpose CPU such as those manufactured by Intel Corporation (Mountain View, CA) or Advanced Micro Devices, Inc. (Sunnyvale, CA). Memory 530 preferably includes a non-volatile, non-transitory, computer readable medium such as a hard drive or flash memory device. Software instructions 532, 534, and 536 found on the memory 530 instruct the processor 520 how to perform the methods of the present invention, including the method 200 set forth in FIG. 2. More specifically, the operating system instructions 532 perform OS management functions that allow the server computer 500 to operate while the APL generation software 534 allows the server computer 500 to operate as the APL server 110. Similarly, the promotion analysis software 536 allows the server computer 500 to operate as the analysis server 120. To improve efficiency, the processor 520 may load software instructions 532, 534, 536 from non-transitory portions of memory 530 into a faster but volatile RAM portion of the memory 530. Data 540 operated upon by the processor 520 can also be stored in non-volatile memory and retrieved into RAM for analysis, recording, and reporting.

The construction of the terminal 140 and store controller 150 is similar to the server computer 500 in that each device contains a processor 520 and programming instructions 532-636 on memory 530 that instruct the processor 520 on how to perform the methods of the present invention. As explained above, any of these devices 110, 120, 140, 150, 500 could easily be implemented as multiple physical computing devices operating together to perform the functions provided in the software.

In the preferred embodiment, the data used by the server computer 500 is stored in a database 540 (which could be a standard relational or object-oriented database or some other type of data store) managed by processor 520 under software programming instructions 534, 536. The database 540 can store data, for example, in pre-defined fields in a database table or as database objects in an object-oriented database environment or as key-value pairs. FIG. 5 shows the database 540 with tables or objects for programs 542, promotions 544, products 546, sponsors 548, groups 550, households 552, benefits 554, members 556, cards 558, transactions 560, transaction items 562, retailer locations 564, and retailers 566. The database 540 tracks relationships between each of the data entities 542-666, which are shown using crow's foot notation between the entities in FIG. 5. For instance, FIG. 5 shows that a single program 542 can be associated with a plurality of promotions 544. As shown in FIG. 5, it is possible to define promotions 544 for a plurality of products 546. The products 546 to which the promotions 544 apply can be defined by a product number, but they can also be defined by a department/subdepartment number, in which case all products in the particular department are included in the promotion 544. A promotion 544 can also be defined by excluding one or more product numbers or department/subdepartment numbers.

In FIG. 5, each program 542 is associated with one or more groups 550, which are described in more detail in connection with FIG. 6. In many cases, the promotions 544 are associated directly with a program 542, but it is possible to assign promotions 544 directly to a group 550 as shown by the dotted crows foot notation 570. Households 552 are assigned directly to groups 550, with each household 552 being assigned to a single group 550 in a program 542. Benefits 554 are tracked at the household level 552 and are associated with promotions 544. When a household 552 uses a promotion 544, such as $4 of frozen vegetables every month, the benefit table or object 554 tracks this use. When step 242 determines available promotions for the user in method 200, the benefits 554 for the user's household 552 are consulted along with the available promotions 544 for the user's group 550 and program 542. Benefits 554 are tracked at a household level 552, which may include multiple (family) members 556. Each member 556 would typically be issued a single card 558, although the issuance of replacement cards 558 would mean that multiple cards 558 could be associated in the database 540 with each member 556.

When a local system 130 submits a list of purchased products to the server system 100 (step 230), a new transaction record 560 is created. The transaction record 560 indicates when (date and time) and where (retail location 564 and terminal identifier) the transaction took place. The transaction record 560 also indicates which card (or cards) 558 was used in the transaction to allow easy identification of the member 556 and household 552 that made the transaction. A plurality of transaction items 562 can be associated with each transaction 560, with each transaction item 562 tracking the purchase of a product 546 under a promotion 544. The transaction item 562 is also associated with a single benefit 554 record, indicating that the benefit record 554 was created or modified as a result of this transaction item 562 (or that the benefit was used up and no discount was provided for this transaction item 562). In one embodiment, the receipt of a filtered list with multiple entries (such as list 480) by the server system 100 would trigger the creation of one transaction record 560 and a plurality of transaction items 562 (assuming the user was otherwise eligible for all of the promotions). Some entries in the list may create zero transaction item records 562 (where the user was not eligible for any promotion on that product), while other entries may create one or more transaction item records 562 (depending on the number of eligible promotions that apply to that product).

Each retailer location 564 is likely associated with a plurality of transactions 560 but only a single retailer 566. While some retailers 566 have an only a single location 564, the database 540 allows multiple retailer locations 564 to be identified as belonging to a single retailer 566. As described above, it is possible that some promotions 544 are defined to be associated with only a single retailer 566. This is shown in FIG. 5 as dotted association 572 and is described in more detail below.

FIG. 5 should not be taken to indicate that the data entities 542-566 in system database 540 need to be implemented exactly as shown, with each entity 542-566 in the Figure implemented as a single database table or object. Rather, FIG. 5 merely indicates that one or more database entities are created within database 540 to track this information. It is well within the scope of the prior art to implement this type of data using a variety of entity architectures.

Retailer Specific APLs

Figure 6:
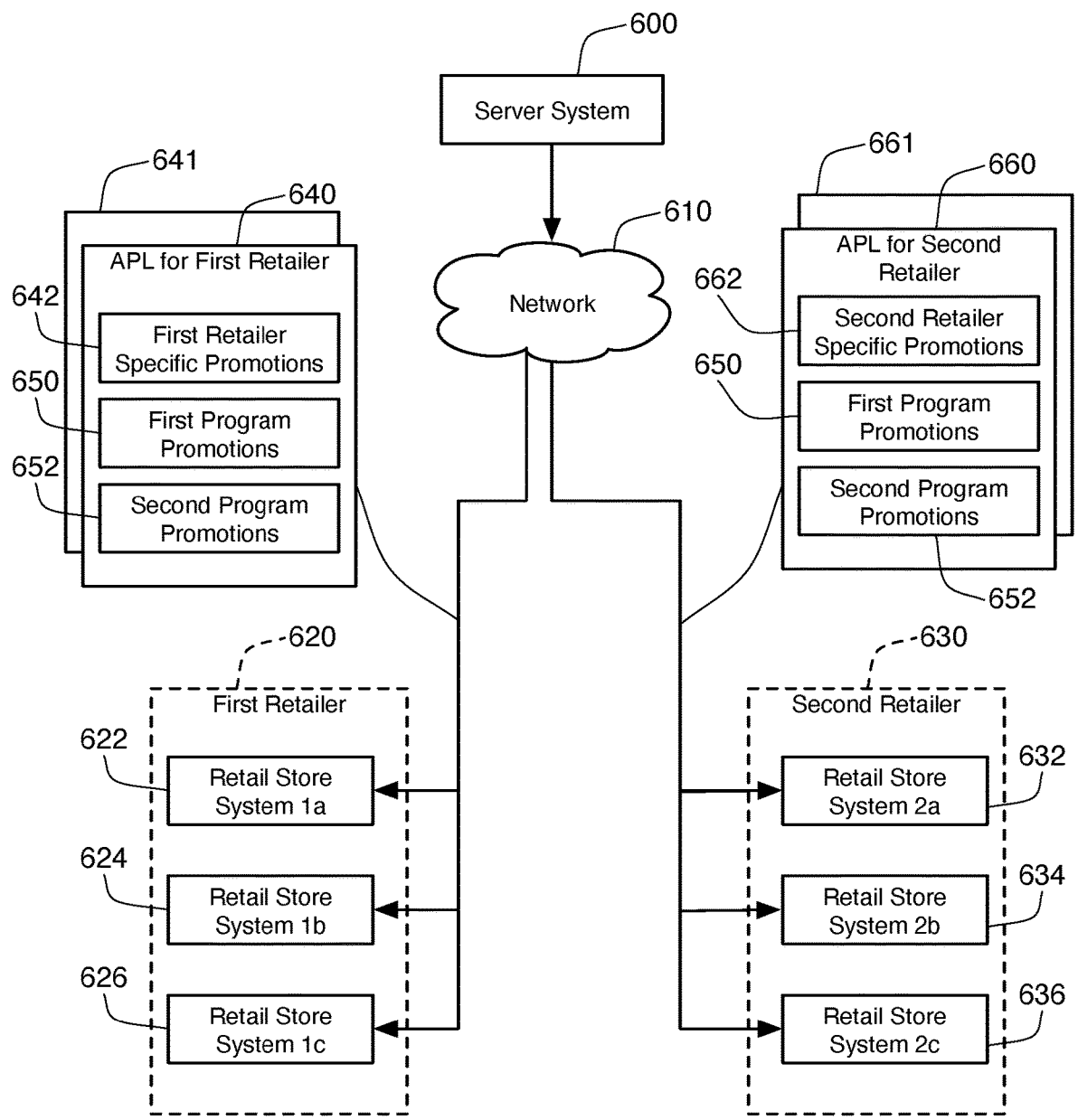
FIG. 6 is a schematic diagram showing the transmission of retailer specific approved product lists to retailer store systems for two different retailers.

FIG. 6 shows a server 600 that provides a first version of an APL 640 for a first retailer 620, and a second version of an APL 660 to a second retailer 630 over a network 610. The creation of these unique APLs is described in more detail in connection with FIGS. 7-13. The server 600 may also provide the retailers 620 and 630 with additional APLs 641, 661 to be implemented by the retailers 620, 630 on a predetermined future date. These APLs 640, 641, 660, 661 can be transmitted from the server system 600 via a VPN or other secure connection over the Internet. If the APLs are updated daily, then it will be preferred to generate all APLs at least two days in advance so that the next two APLs will be ready for downloading at any given time.

The APL 640 for the first retailer 620 includes an approved product list relevant to promotions 642 specific to the first retailer 620 as well as the promotions in a first program 650 and a second program 652. The product list provided to the first retailer 620 may related to both department and subdepartment includes and excludes, and these will be particularly identified according to the departments and subdepartments of that first retailer 620. The APL 660 for the second retailer 630 includes promotions 662 specific to the second retailer 630 as well as the promotions in the first program 650 and the second program 652. Note that FIG. 6 shows the retailer specific promotions 642, 662 outside the context of the promotions for specific programs 650, 652. As this infers, one embodiment of the system assigns retailer specific promotions to all customers shopping at the retailer without regard to the program of the customer. In other embodiments, retailer specific promotions are always assigned to a particular program. FIG. 6 also shows that the APL 640 for the first retailer 620 is provided to all the retail store systems 622, 624, 626 operated by the first retailer 620, while the APL 660 for the second retailer 630 is provided to all the retail store systems 632, 634, 636 operated by the second retailer 630. The first retailer 620 may, for example, operate all these stores 622, 624, 626 under the same "banner" or name. A single company may operate retail stores under different banners, with each banner having a different selection of products and a different organization of departments and subdepartments. In some embodiments, a retailer 620 that operates different banners are provided separate merchant identifiers and are treated as separate merchants by the system 10.

One embodiment of the present invention requires the communications from the first retailer 620 to include a first merchant identifier and communications from the second retailer 630 to include a second merchant identifier. These merchant identifiers allow the server system 600 to identify the retailer 620, 630 from which it is receiving the communication. These identifiers may be specific to an individual store 622-626, 632-636. Regardless of whether merchant identifiers are presented during communication, the server system 600 is designed to push the APLs 640, 641, 660, 661 to the particular retail store systems 622, 624, 626 and 632, 634, 636, and hence will know which version each system 622, 624, 626 and 632, 634, 636 should receive.

Tag-Based Filter List Configuration

Figure 7:
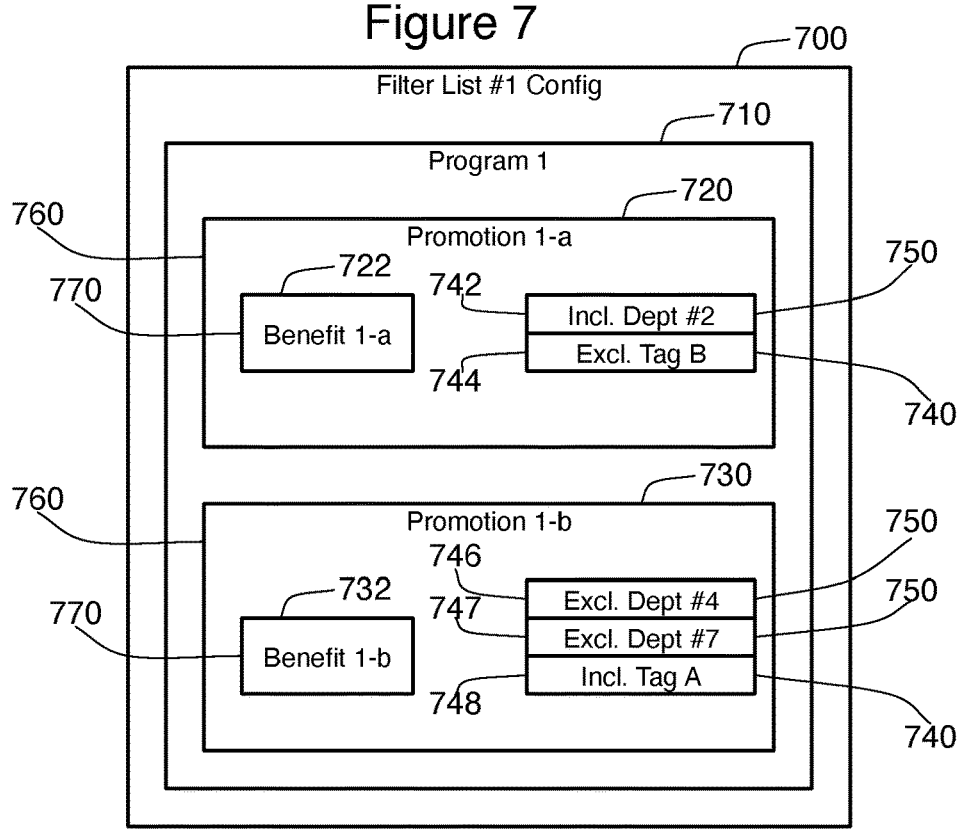
FIG. 7 is a schematic view of a configuration for creating filter lists.

In some embodiments, a filter list 152 can be created using a tag-based configuration. A configuration is file or data structure that defines the information needed to make custom filter lists for a plurality of local systems 130, 180. FIG. 7 shows one example of a filter list configuration 700 that could be used in a retail environment. This configuration data 700 can take the form of a tagged text or binary file, a data structure, elements of data in a database, or any other format of storing structured data. Rather than specifying the exact product identifiers and retailer-specific departments to include and exclude in the filter list 152, configuration 700 utilizes tags 740 and unified departments identifiers 750. These unified department identifiers 750 can identify the highest-level department in a department hierarchy, or a subdepartment within that same hierarchy. The word "department" is used in this context as it is a categorization hierarchy that is frequently used in the retail setting. More generically, the term "unified department identifier" could be replaced with unified group identifier in order to more generally describe the grouping that may be applied to items by a local system 130, 180.

As explained above, departments and subdepartments are used by retailers to organize the products that they sell. These retailers, such as retailers 620, 630, separately define their individual department structures, making it more complicated to define a universal filter list 152 based on these departments that applies across retailers. To overcome this difficulty, a unified department hierarchy is defined that includes a master, de-duplicated list of all products sold by all retailers 620, 630.

Configuration files such as configuration 700 define processing that the server system 100 performs on the data 142, 182 gathered by the local systems 130, 180. As explained above, not all of the data 142, 182 gathered needs to be processed by the server system 100, thus filter lists 152, 184 are generated to define a subset of that data 142, 182 that is to be transmitted to the server system 100 for processing. Typically, the server system 100 will perform different processes that that performed by the local systems 130, 180, and this only a on subset of the raw data 142, 182. Because these processes change, and the subsets upon which these processes change, the filter list server 110 will periodically generate updates to the filter lists 152, 184 transmitted to the local systems 130, 180.

In the embodiment shown in FIG. 7, configuration 700 defines promotion processing that is to be performed on a subset of purchase data 142, 182 collected at local retail settings 130, 180. The individual processes performed by the analysis server 120 of the server system 100 relate to a plurality of promotions that each apply to a different subset of data. Configuration 700 is shown defining two promotions 720, 730 for a single program 710 (program 1). The first promotion 720 is for promotion 1-a that provides benefit 1-a 722 to a plurality of purchased products (identified in raw data 142, 182) during a transaction. Rather than defining the eligible products using product and retailer-specific department identifiers, the configuration 700 defines the products eligible for benefit 1-a 722 using unified department identifier #2 742 and tag B 744. Department #2 742 is specified in the configuration 700 for promotion 1-a 720 as an included department, indicating that data associated with department #2 will be included and therefore eligible for benefit 1-a 722 under promotion 1a 720. Tag B 744 is used as an exclude tag, which means that products associated with tag B 744 will be excluded and therefore ineligible for benefit 1-a 722. The narrower tag level configuration elements 740, such as tag B 744, will generally take precedence over unified department configuration elements 750, such as department #2 742, so any goods that are associated with both included department #2 742 and excluded tag B 744 will be excluded from benefit 1-a 722.

Promotion 1-b 730 is similar, in that it identifies those products purchased during a transaction that are eligible for a benefit, in this case benefit 1-b 732. Promotion 1-b 730 is associated with an excluded unified department #4 746, an excluded unified department #7 747, and included Tag A 748. In these circumstances, benefit 1-b 732 can be applied to all possible products that are not associated with either of the excluded departments #4 746 and #7 747. However, products included in the excluded departments 746, 747 will nonetheless be eligible for benefit 1-b 732 if the products are also associated with Tag A 748. Again, the tag element 740 works as an exception to the department level configuration elements 750.

To generalize, configuration 700 defines processing, such as analyzing a promotion 760 that applies a benefit 770, that is applicable to a subset of the data 142, 182 received by the local systems 130, 180, and this subset is defined by one or more included or excluded tags 740 or unified data hierarchy identifiers (departments) 750. In many cases, each tags 740 is used to define multiple, data-element level exceptions to the listed unified departments 750.

When two or more unified departments 750 are associated with the promotion 760, they are likely to be either all included departments (defining multiple departments 750 that are included in the promotion 760) or all excluded departments (defining the departments 750 that are not included in the promotion 760, which implies that all other unlisted unified departments are included). In some embodiments, the promotion 760 itself is identified as an include promotion, in which everything is included unless explicitly included, or an exclude promotion, in which everything is excluded unless explicitly included. Where all specified unified departments 750 are included, the promotion 760 is likely an exclude promotion 760. Where all specified unified departments are excluded, the promotion is likely to be an include promotion 760. A promotion 760 would not be defined by both an included unified department 750 and an excluded unified departments 750, as there is generally no overlap between departments 750 and the recitation of an excluded department implies that all other departments are included.

Both highest-level departments and subdepartments in the unified department hierarchy can be included or excluded in configuration 700. However, if a department 750 is included, it would be feasible for a subdepartment in that department 750 to be excluded, with the more specific element (the subdepartment exclusion) taking precedence for products that fall both within the subdepartment and the department 750. Similarly, if the department 750 is excluded but the subdepartment is included, products falling within both will follow the narrower subdepartment inclusion.

Rules

Figure 8:
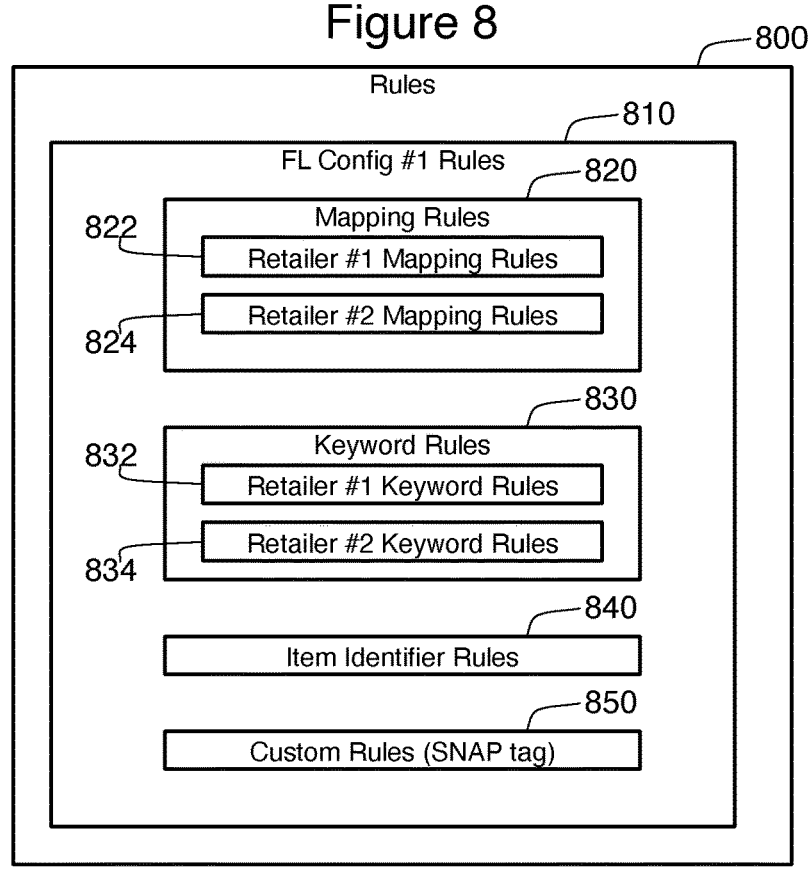
FIG. 8 is a schematic view of a plurality of rules.

Because configuration 700 identifies which pieces of data are to be processed by using tags 740 and unified departments 750, there needs to be a mechanism to associate these tags 740 and departments 750 with the products and department identifiers used by the retailers 620, 630. This is accomplished using rules 800, as shown in FIG. 8, which are responsible for assigning assign tags 740 and unified departments 750 to the product identifiers and department used by the retailers 620, 630. The tags 740 assigned are generally specific to the filtered list configuration 700 that uses the tags 740 for its promotions 760. Thus, FIG. 8 shows a grouping of rules 810 that are association with filter list #1 configuration 700. Another grouping of rules (not shown) could exist within the set of all rules 800 that are appropriate for a different filter list configuration.

While FIG. 7 shows different tags 740 being used by the two promotions 760, it is possible to reuse tags 740 within a configuration 700 in different promotions 760 or even within different programs 710 (although only one program 710 is shown in filter list configuration 700). The tags 740 must, however, have a consistent meaning wherever used within a single filter list configuration 700.

Four types of rules 800 are generally used to assign tags 740 and unified departments 750, namely mapping rules 820, keyword rules 830, item identifier rules 840, and custom rules 850. The mapping rules 820 are shown with one set of rules 822 for the first retailer 620 and a different set of rules 824 for the second retailer 630. The keyword rules 830 also include rules 832 for the first retailer 620, and rules 834 for the second retailer. The item identifier rules 840 are generally retailer agnostic, because they identify products using a universal code (UPC) which spans across retailers. Although this is not shown in FIG. 8, the custom rules 850 may have separate rules for each retailer 620, 630 using the system 10.

Assignment of Tags

In order to assign tags to the products, departments, and sub-departments of the retailers 620, 630, it is necessary for the retailers 620, 630 to provide an appropriate list to the server system 100. Received list 900 is a list received from the first retailer 620 by the server system 100. It includes a listing 902 of all departments 910 and subdepartments 920 identifiers used by the retailer 620 to group the items sold by the retailer 620, including a department description 930 from the retailer 620 for these entries. The departments 910 and subdepartments 920 found in the received list 900 can be considered list group identifiers, since they specify the grouping identifiers for the items in this particular received list 900. From this listing 902, it can be seen that the first retailer uses department number 1 to indicate the food department, and department number 2 to indicate the health department. The food department (#1) has at least two sub departments, namely "a" for groceries and "b" for candy.

The list 900 also includes a listing 904 of all of the products sold by the first retailer 620. Each product on the listing 904 is identified by a product identifier 940, a department assignment 910, a subdepartment assignment 920, and a product description 970. The product identifier can take the form of a UPC, which is the 12-digit Universal Product Code, or any of the other variations of uniform product identifiers that may or may not be based upon the UPC. In FIG. 9, product identifier 940 is shown as a four-digit decimal number. This number is merely a representation of a universal number for the purpose of explaining the following embodiments. The product listing 904 shown in FIG. 9 does not show all of the data that is provided by the first retailer 620 about the products, as list 904 is merely illustrative of the most relevant data. For example, the first retailer 620 might apply flag values to certain products (such as a flag that identifies SNAP eligible products), and these flag values can be included in the data 900 provided by the retailer 620.

The second retailer 630 provided a different list 1000, as shown in FIG. 10. This list also includes two portions, a department/subdepartment listing 1002 and a product listing 1004. A quick comparison between the lists 900, 1000 of the two retailers 620, 630 reveals that the retailers 620, 630 define the departments and sub-departments differently, and consequently likely assign the same products (identified by the uniform identifiers 940) to completely different departments and subdepartments.

The rules 800 for each filter list are applied to the lists 900, 1000 provided by retailers 620, 630 in order to assign tags 740 and unified departments 750 to the individual products sold by, and the departments used by the retailers 620, 630. As explained above, the rules 800 are defined separately for each retailer. Thus, the first set of mapping rules 822 is applied to the first retailer list 900, and second set 834 is applied to the second retailer list 1000.

FIG. 11 shows mapping rules 822, which are designed to match the data 900 received from the first retailer 620. In particular, the mapping rules 822 will rely upon the assignment of departments 910 and subdepartments 920 made by the retailer 620 in list 904 to map tags to particular products. While doing so, the mapping rules 822 will also map the correlation between the departments (and subdepartments) of the retailer 620 shown in list 902 with the unified departments (and subdepartments) 750. Each of the rules 822 includes fields or values that are designed to match items in the first retailer's data 900. In FIG. 11, these fields or values are:

Banner ID (with the term Banner meaning name of the chain or retailer 620, 630, and ID being an internal identifier used by the server system 100 to identifier the retailer 620, 630);

Banner Name (name of the retailer 620, 630)

Department Number (department number/identifier 910 used internally by the retailer)

Department Name (department description or name 930 used internally by the retailer);

Subdepartment Number (number/identifier 920 for a subdepartment used internally by the retailer);

Subdepartment Name (description 930 for a subdepartment used internally by the retailer);

Unified Department Number 750 (number used by the server system 100 to create a master product and department list applicable to all retailers 620, 630 according to a unified department structure);

Unified Department Name (name of unified departments 750 used by the server system 100)

Unified Subdepartment number (the department number 750 of a unified subdepartment)

Unified Subdepartment Name (name of the Unified subdepartment)

Tag 1 (the first tag 740 assigned upon a match)

Tag 2, Tag 3, Tag 4, . . . (additional tag, or tags, 740 also assigned upon a match).

The Name fields (Banner Name, Dept. Nam, Sub-Dept. Name, Unified Dept. Name, and Unified Subdepartment Name) are not necessarily required within the rules 822 as the associated numbers or identifiers are sufficient to make a match and assign values. The names fields are, however, helpful in understanding the functioning of the process.

Rule 1110 in FIG. 11 matches all of department number "1" (the Food department) with tag A 742. The rule 1110 will also associate this department with Unified Department number 2, which is labeled Groceries. In some context, the department number ("1") received from the list 900 will be referred to as the list department number, list department identifier, or even list group identifier, in order to distinguish it from the unified department number (2) (or unified group identifier). Rule 1120 applies to subdepartment "a" (Groceries) of department 1. This rule 1120 assigns products in this subdepartment into subdepartment b of unified department number 2. In addition, rule 1120 applies both Tag A 742 and Tag G (not shown in FIG. 7) to the entirety of the first retailer's department number 1, subdepartment a. In contrast, rule 1110 applied only a single tag, (tag A 742). Rule 1130 associates subdepartment b of the retailer's department 1 (the Candy subdepartment) to unified department 17 and applies Tag B.

FIG. 12 shows the keyword rules 832 for the first retailer 620. The first of these rules 1210 contains the string "Cookie" in the key text field. Rule 1210 applies to all items at the first retailer 620 that are found in the retailer's department 1, subdepartment a, and that include the string "Cookie" in the product description field 970 in the retailer's product list 904. In some embodiment, a match can be made across multiple fields, not just the product description field 970. As seen in FIG. 9, rule 1210 will cover the "Sugar Cookies" product having product ID 1235. It will also cover any other product in listing 900 that is both found in subdepartment a of department number 1 and includes the key text "Cookie" in the product description field or any other of the fields search for using the keyword (the keyword search fields). For these matching items, the tag B 744 is applied. In addition, rule 1210 also assigns unified department number 2 and subdepartment f to matching products. Rule 1220 is similar to rule 1220, but it looks for the key text Cupcake. These rules are designed to handle special situations where the department organization of the first retailer 620 does not match the unified departments created by the server system 100. If not for these rules 832, products including the word cookie or cupcake in their descriptions would have been associated with unified department 2, subdepartment b, and tagged with tag A and G instead of tag B.

FIG. 13 shows an item identifier rule 1300, which constitutes the only item identifier rule 840 that is applied to the products of the first retailer 620. These types of rules apply only to specified item identifiers 940. Rule 1300 applies only to item identifier 2814 (not shown in FIG. 9). When this item is found, it is assigned a unified department and subdepartment (namely 2-*f*), and tag B 744.

FIG. 14 shows the fourth type of rule—the custom rules 850. In FIG. 14, there is only one such rule that is applicable for the first retailer 620, namely rule 1400. These rules can be defined in a variety of ways, but again are based upon item information 904 presented by the first retailer 620. As explained above, FIG. 9 does not show all data elements that might be included in the item list 904. For example, many retailers add a flag value to all items that they stock that are eligible for SNAP benefits from the government. This flag value can be included in their item information 904. In addition, retailers may have an OTC flag to identify over-the-counter drugs. Rule 1400 might then identify items that have the SNAP flag value and then assigns those items tag S. In one embodiment, custom rules 850 take the form of SQL queries that identify items in item lists 904, 1004.

Applying Rules to Tag Items

FIG. 15 shows a method 1500 for tagging the data 900 1000 submitted by the retailers 620, 630 using rules 800. The result of applying the rules 800 to the data 900 of the first retailer is shown in FIG. 16. By the end of method 1500, the retailer's departments 1, 2, and 3 will be mapped or assigned to unified departments 2, 1 (subdepartment a), and 17 (subdepartment a), respectively; while subdepartments a and b of the retailer's department 1 will be assigned to unified department 2, subdepartment a, and to department 17, respectively.

Method 1500 starts by identifying a configuration 700 at step 1502. Configurations 700 can be defined for sets or pluralities of promotions 760. A promotion collection can be defined as a set of promotions 760 that share a common tags 740. Because tags 740 are given meaning by their context (namely, how they determine applicability of benefits 770), tags should have a consistent meaning within a single configuration 700. Multiple configurations 700 can exist, but typically only one configuration 700 will be applicable at any given team in order to avoid conflicting definitions of tags 740 (from the associated rules 800). If the rules 800 associated with a configuration 700 are altered, method 1500 is run again on the revised rules 800 for the configuration 700. Before each selection of a configuration in step 1502, therefore, it is best to clear all assignments of tags 740 that have been previously made.

The next step 1504 is to identify the rules 800 that have been defined for the selected configuration 700 (namely, rules 810). In particular, since the rules 800 are specifically defined according to the retailer 620, 630, step 1504 selects all the rules 800 that are defined for a first of the available retailers for the configuration 700. Step 1504 will be repeated with each retailer 620, 630 using the system 10. It is step 1506 that determines when rules 800 for all of the retailers 620, 630 have been selected.

Step 1508 then identifies the data list that has been submitted for a retailer. If the first retailer 620 was selected in step 1504, step 1506 will select the first retailer rules 800, namely rules 822, 832, 1300, and 1400. Likewise, step 1508 will select the data 900 submitted by the first retailer 620.

At step 1510, the custom rule or rules 850 for this retailer 620 are applied. As shown in FIG. 14, example rule 1400 finds all SNAP eligible items (where the SNAP flag was set by the retailer 620) and assigns those items Tag S. This rule 1400 is not defined as a match that is applied on a product-by-product basis. Rather, the rule 1400 can retrieve multiple products at once and apply a tag. If matches are found, step 1512 will apply the rule and assign tag S to the items. Note that the other rule types 820, 830, 840 are generally applied most specific to most general, with only one rule applying to an item, as is described in more detail below. Custom rules 850, such as 1400, can be constructed as an additional rule—one that applies in addition to the most specific rule 800 that will otherwise apply. This is not a requirement, however, and custom rules 850 can be established such that when a custom rule 850 applies to an item, no other rule 800 is applied.

At step 1514, a single item is selected from the list 904 of items sold by this retailer 620. Each item will be examined in turn, with step 1516 determining when all the items have been examined. Once an item is identified, step 1518 determines if any item identifier rules 840 apply to this item. As shown in FIG. 13, only one item will match item identifier rule 1300, namely the item with an ID of 2814. If this is the currently selected item, then the method 1500 progresses to step 1520. At this step, the product detail from item 2814 will be entered into a unified item master list. This list resides in the data 115 at the server system 100, and it contains a list of all items sold by all retailers 620, 630 using the system 10. The matched item is inserted into this list, but only if this insertion doesn't create a duplicate entry. In many cases, multiple retailers 620, 630 will sell the same item. If the item already exists in the list, step 1520 will not add another entry in order to avoid duplication.

At step 1522, the method 1500 will assign a unified department and subdepartment for this item in the unified item master list. For item 2814, a unified department of 2 and a subdepartment of "f" will be assigned. Step 1524 then tags this item. According to rule 1300, tag B will be assigned to item 2814. Processing then returns to step 1514, when the next item in the item list 904 is selected.

Step 1526 follows step 1518 if the item identifier rule 840 does not apply to the selected item. At step 1526, the selected item is compared to the keyword rules 832 for the first retailer 620, namely rules 1210 and 1220 from FIG. 12. If the currently selected item matches these rules 832 (if the item description contains the characters "cookie" or "cupcake," then processing goes to step 1520. Steps 1520 through 1526 will operate in the same fashion as they did if there were an Item ID rule match detected at step 1518. The item will be inserted into the unified item master list at step 1520 if it is not there already. Rules 1210 and 1220 both assign unified department 2 and subdepartment "f" to the item, (step 1522) as well as tag B (step 1524). Processing then returns to step 1514 and the selection of the next item.

If no keyword rule 832 matches the selected item, step 1530 will examine the mapping rules 820. More particularly, step 1530 examines only the mapping rules 822 for the first retailer 620 that specify a subdepartment (other than simply specifying ALL subdepartments). If the selected product matches one of these rules (and each product should only match one subdepartment rule or none), then the matching rule is used to perform steps 1520-1524. The product with an ID of 1236, for example, is assigned by the retailer to the retailer's department 1, subdepartment "a" (as can be seen in list 904). Therefore, mapping rule 1120 applies to this product. Step 1520 will insert this product identifier into the unified item master list if necessary. Step 1522 will assign unified department 2 and unified subdepartment b to the item in this unified item master list, and step 1524 will assign both tag A and G to the item in that same list. This can be seen in FIG. 16. Processing then continues at step 1514.

Note that if product 1234 had been the selected product, rule 1130 would have applied since product 1234 is assigned to subdepartment "b" of department 1. Rule 1130 indicates that this product is assigned to unified department 17. No unified subdepartment is indicated in this rule 1130, so none is assigned. Rule 1130 does apply tag B to the product. This can also be seen in FIG. 16 at 1604.

If there is not subdepartment level match, then step 1530 determines whether there is a match with a matching rule 822 that applies to all subdepartments 920 of a department 930. Rule 1110 is an example of such a rule. If the product matches this department, then this rule 1110 will be applied to the item and steps 1520-1524 will be performed. Note that steps 1518, 1526, 1528, and 1530 are designed to apply only a single rule 800 to an item, namely the most specific rule that matches that item.

Once step 1516 determines that all items in the retailer's list 904 has been examined, step 1532 will examine each of the mapping rules 822 to establish a relationship between the departments 910 and subdepartments 920 of the selected retailer and the unified departments and subdepartments 750. The result of this process is also shown in FIG. 16.

Next, step 1504 selects the configuration rules 800 for the next retailer, such as the second retailer 630. Steps 1508 through 1532 are then applied to the data 1000 received from the second retailer 630 in order to complete the creation of the unified item master list.

Figure 17:
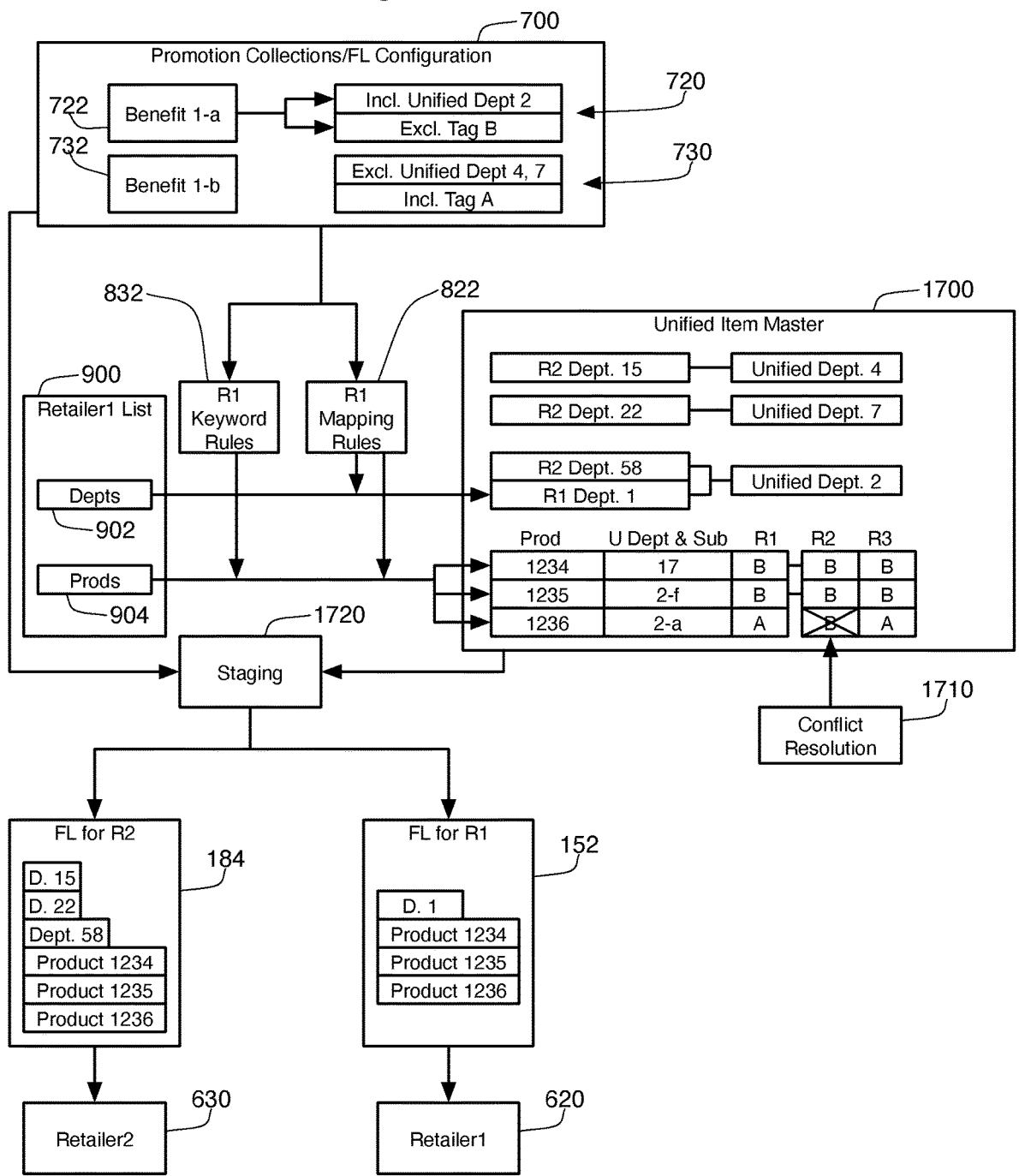
FIG. 17 is a schematic view illustrating the application of the method from FIG. 15.

FIG. 17 shows the impact of method 1500 in a schematic manner that is helpful for understanding the next portion of method 1500. As previously explained, method 1500 identifies configuration 700 for promotion 1-*a* 720 and 1-*b* 730. Rules relevant to that configuration for the first retailer 620, including mapping rules 822 and keyword rules 832 are applied to the data 900 provided by the first retailer 620. In particular, the mapping rules 822 are applied to the department list 902 in order to associate the departments 910 and subdepartments 920 of the first retailer with unified departments and subdepartments. In particular, department 1 of retailer 1 is associated with unified department 2. When rules 800 for the second retailer 630 are applied to the data 1000 provided by the second retailer 630, the mapping rules 820 will assign department 58 of the second retailer 630 with unified department 2. This can be seen in the unified item master list 1700.

Both the keyword rules 832 and the mapping rules 822 (along with other rules 800) are used to analyze the product list 904 of the first retailer in order to complete the product information in the unified item master list 1700. Thus, after processing, product identifiers 1234, 1235, and 1236 are entered into the unified item master list 1700, and associated with unified departments-subdepartment 17, 2-*f*, and 2-*a*, respectively. Tags are also assigned, with all three items being tagged with tag S (SNAP eligible), and item 1236 being tagged with tag G. These tags S and G are included in the unified item master list 1700, but they are not shown in FIG. 17 in order to simplify the drawing. Instead, only tags A and B are shown. Note that it is not necessary that all product identifiers in the unified item master list 1700 be associated with any tag, or indeed with any unified departments or sub departments.

Tags A and B can be defined as conflicting and are so defined in this example. An item can be tagged with tag A (meaning "Healthy Food," for instance) or tag B (meaning "Dessert," for instance), but not both. The first tag shown in FIG. 17 next to each product listed is the tag assigned by rules 822, 832 for the first retailer 620 (or "R1"). Next to this tag are the tags assigned to these products by the second retailer 630 (R2) and a third retailer (R3). Because tags A and B are conflicting tags, both cannot be assigned to the same product in the unified item master list 1700. Nonetheless, product 1236 has been assigned both tags.

To resolve this conflict, conflict resolution programming 1710 is applied to the situation. Returning to FIG. 15, after step 1506 determines that rules 800 for all retailers have been examined, step 1540 has this programming 1710 identify tag conflicts such as the conflict just identified for product 1236. Conflicts are generally resolved by analyzing the total number of tags 740 while considering an assigned "weight values" that is linked to each assignment. Weight values are linked to the tag assignments during step 1524, and the consideration of these weight values in order to resolve a tag conflict occurs at step 1542. An assignment made by a more specific rule is generally given a greater weight than an assignment made by a more general rule. The steps 1518, 1526, 1528, and 1530 run from more specific to less specific, so the weight value given after a match at steps 1518 and 1526, for instance, would be given more weight than those assignments made after steps 1528 and 1530. Nonetheless, numerous, low-weight assignments might overwhelm a single, higher-weight conflicting tag assignment. Once the weights are determined and compared, a single tag 740 is assigned to the product, with conflicting tags removed or invalidated. In FIG. 17, the tag B assigned to product 1236 has been invalidated through this conflict resolution. Method 1500 then ends at step 1544.

Staging—The Creation of a Filter List

Figure 18:
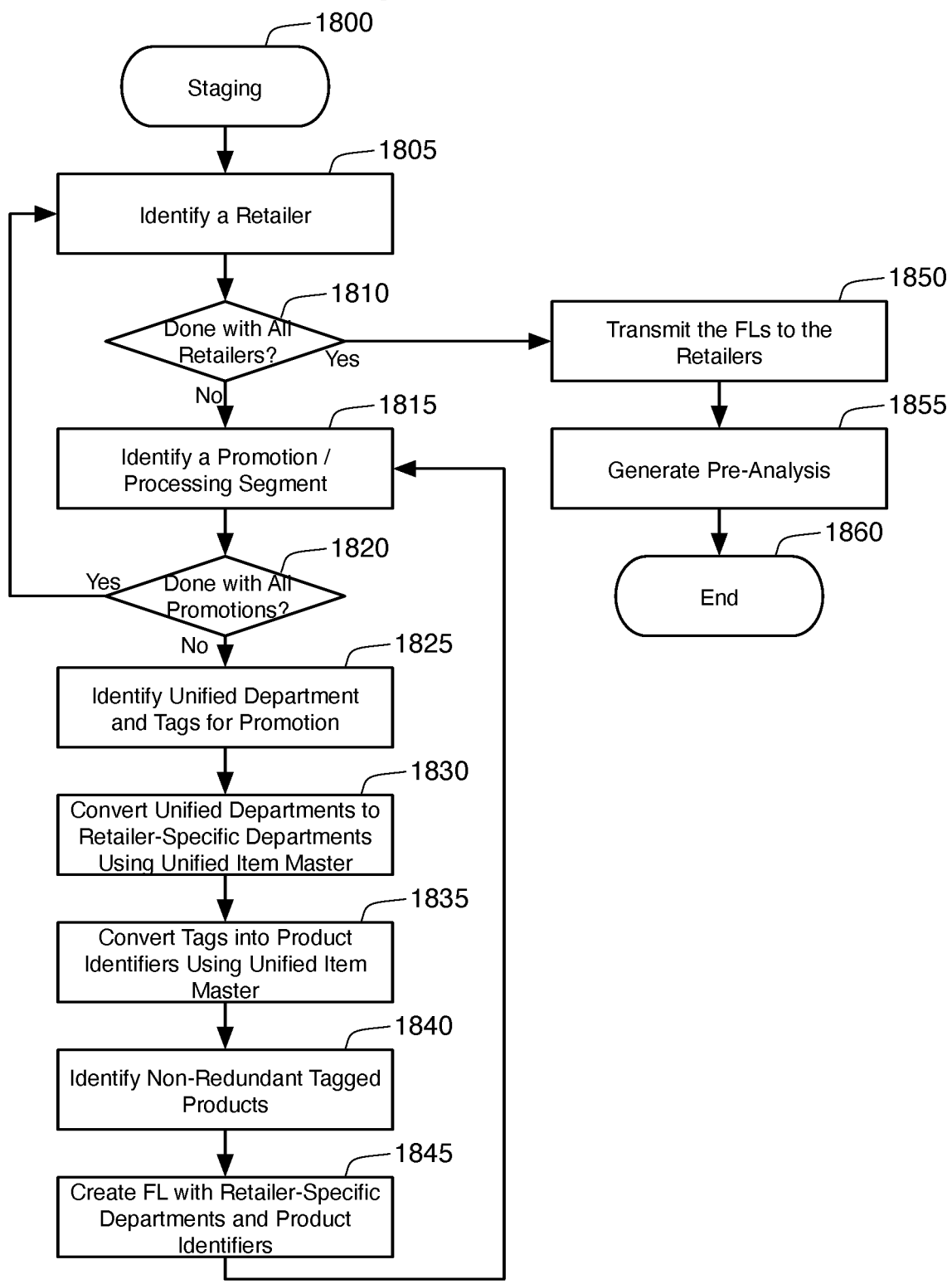
FIG. 18 is a flow chart showing a method of generating filter lists and pre-analysis data.

The tags 740 included in the product list found in the unified item master list 1700 and the association between assigned unified and retailer departments and subdepartments found in the same list 1700 are used by staging programming 1720 to generate the filter list 152 for the first local systems 130 (assuming that it belongs to the first retailer 620) and the filter list 184 for the second local system 180 (assuming that it belongs to the second retailer 630). As explained above, it is the filter list configuration 700 that associates promotions 720, 730 unified departments 750 and with tags 740. Tags 740 are now clearly associated with individual products in the unified item master list 1700. So too are unified departments 750 associated with the retailer specific departments 910 and subdepartments 920. Thus, in order to create the filter lists 152, 184, staging engine 1720 compares the requirements of the promotions 720, 730 in the configuration 700 against the information now found in the unified item master list 1700. The method 1800 for doing this is shown in FIG. 18.

The first step 1805 of method 1800 is to select one of the retailers for which the method 1800 is going to generate a filter list 152, 184. For example, step 1805 might select the first retailer 620. All retailers will have filter lists generated for them, so each retailer will be selected in turn at step 1805. Step 1810 determines when all retailers have been processed.

At step 1815, a promotion 760 in the configuration file 700 is selected. If the configuration file 700 is handling segmented processing outside of the retailer environment, the processing segment is identified. All promotions 760 or processing segments will be analyzed in turn.

Next, step 1825 identifies all of the relevant tags 740 and unified departments (and sub departments) 750 that are found in the selected promotion 760 as defined in the configuration file 700. For example, for promotion 720, benefit 1-a 722 has an include reference to unified department 2 and an exclude reference to tag B, while promotion 730 has an exclude reference to unified departments 4 and 7 and an include reference to tag A.

At step 1830, each of the unified departments and/or subdepartments 750 identified in step 1810 are converted into the departments 910 and/or subdepartments 920 of the retailer. For the first retailer 620, unified department 2 is converted into department 1. According to the unified item master list 1700, the first retailer does not have a department equivalent for unified departments 4 and 7. This is a common occurrence, as not all retailers sell all types or unified departments 750 of merchandise.

Step 1835 translates the tags 740 into product identifiers and selects those identifiers. The unified item master list 1700 can be used to identify all items that have been tagged with tag A or tag B (the two tags identified at step 1810). In FIG. 17, this includes items 1234, 1235, and 1236.

Step 1840 analyzes the includes and excludes for the promotion identified in step 1815 to determine if any of the product identifiers selected in step 1835 are redundant in light of the unified departments identified in step 1825. For example, a promotion may include unified department 4, include tag C, and exclude tag D. Redundant identified products are products associated with an identified tag that are already identified as part of a department or subdepartment level for that promotion. As explained above, if a department is identified in a filter list 152, 184, the local systems 130, 180 will provide product level detail in the filtered data 154, 186 transmitted back to the server system 100 for all products within that department. Thus, let's assume that product identifiers 7777 and 8888 are both in included unified department 4. If product 7777 were tagged with included tag C, product 7777 is redundant and need not be included as part of the filter list 152, 184 for this promotion. This is because the local systems 130, 180 will include product-level details for all items purchased in unified department 4 including product 7777 without having the item included in the filter list 152, 184.

If product identifier 8888 were tagged with the excluded tag D, this product identifier may or may not be considered redundant. If an embodiment wants the local systems 130, 180 to identify this item in the filtered data 154, 186 as excluded (as opposed to included), then it is important to separately identify item 8888 in the filter list 152, 184 along with an indication that this is an excluded item. If, however, an embodiment does not require the local system 130, 180 to distinguish between included and excluded items (which will nonetheless be analyzed by the analysis server 120), then the filter list 152, 184 may not have any indication as to whether a particular item will be included or excluded from a promotion 760 (as the local system 130 will be unaware as to which it is). In this context, the filter list 152, 184 need only identify sufficient elements so that all the necessary data is included in the filtered data 154, 186, meaning that product identifier 8888 would be treated no different than product identifier 7777, and both would be considered redundant.

At step 1845, the filter list (such as FL 152 for the first retailer 620) is created using the retailer-specific departments and the appropriately tagged, non-redundant item identifiers. FIG. 17 shows that the filter list 152 for the first retailer 620 includes department number 1, and product identifiers 1234, 1235, and 1236.

Next, the process 1800 returns to step 1815, where the next promotion 760 or processing segment is selected. If step 1820 determines that processing for all promotions 760 is complete, the method 1800 returns to step 1805 and the next retailer is selected. FIG. 17 shows that the filter list 184 for the second retailer 630 would include the same three product identifiers (1234, 1235, and 1236) plus departments 15, 22, and 58. When all the retailers have been processed, step 1850 transmits the filter lists 152, 184 to the retailers for use in the local systems 130, 180. Because of method 1800, each retailer 620, 630 will receive a distinct filter list 152, 184 that will likely differ from those received by other retailers. At step 1855, in at least one environment, the method 1800 utilizes the analysis that it just completed to develop pre-analysis 1900, which is described in more detail immediately below. The method ends at step 1860.

Pre-Analysis Data and Server Analysis Processing

Figure 19:
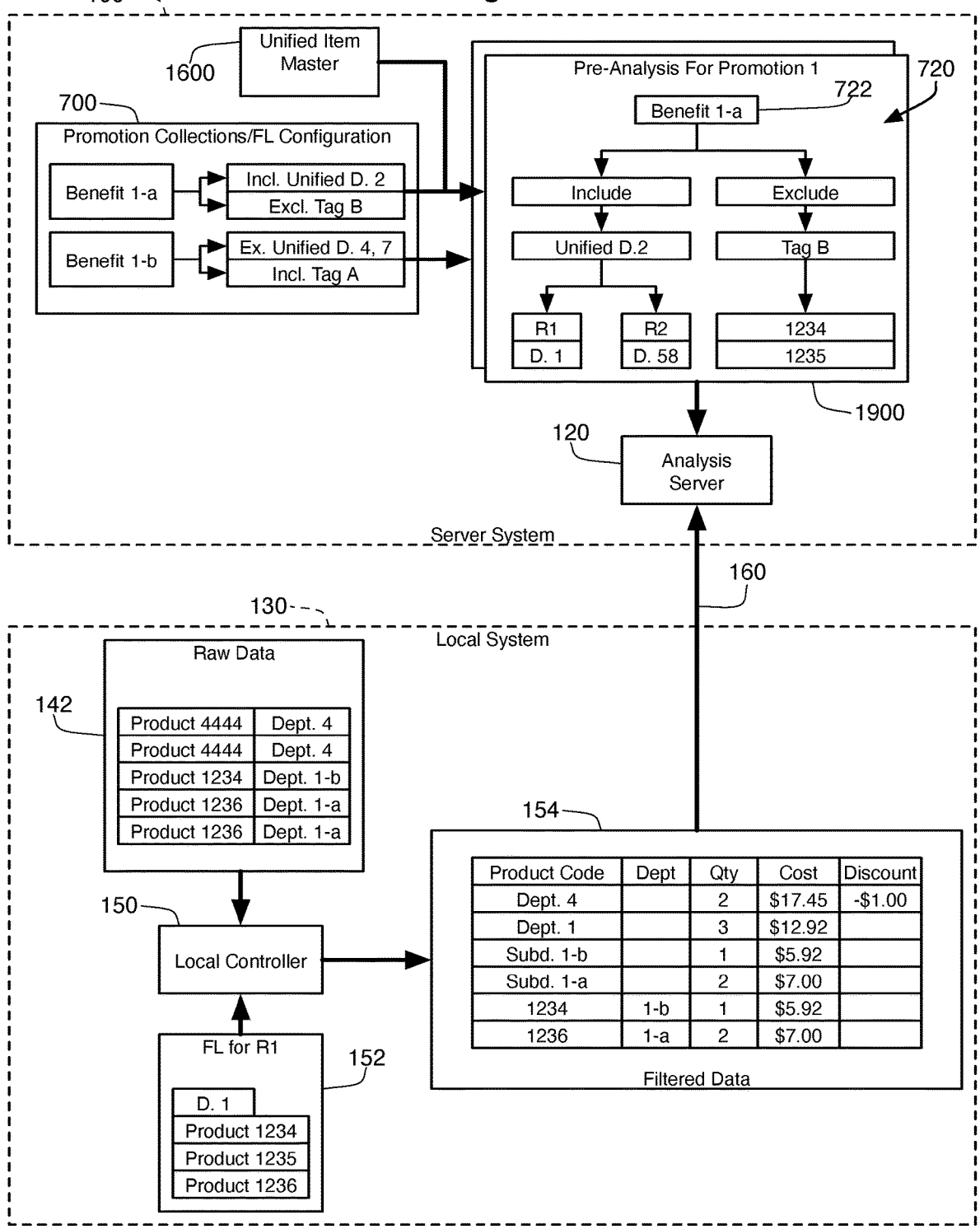
FIG. 19 is a schematic view showing the use of the filter lists.

Pre-analysis data 1900 is similar to the filter lists 152, 184 sent to the local system 130, 180, except that the constructed data is stored and retained at the server system 100. As illustrated in FIG. 19, pre-analysis data 1900 contains information relating to promotion 720. Nonetheless, information about other promotions 760 associated with the configuration 700 also existing in this data 1900. As shown in FIG. 19, the pre-analysis data 1900 identifies for each unified department 750 in promotion 720 the relevant retailer departments (as determined at step 1830). For promotion 720, only unified department 2 is relevant, so pre-analysis 1900 links this department with department 1 for the first retailer 620 and department 2 for the second retailer 630. The pre-analysis data 1900 also identifies each product identifier associated with a tag 740 for the promotion 720 (as determined by step 1835). In this case, the pre-analysis data 1900 shows that item numbers 1234 and 1235 are associated with tag B.

The pre-analysis 1900 does indicate whether each element (department 750 or tag 740) is included or excluded in the promotion 760. Thus, for the first promotion 720, benefit 1-*a* 722 is determined to be available by including uniform department 2 742 and excluding tag B 744. Using the analysis from method 1800, uniform department 2 742 is the same as department 2 for the first retailer 620 and department 58 for the second retailer 630. Also, method 1800 has already determined that excluded tab B 744 is equivalent to product identifiers 1234 and 1235. This pre-analysis information 1900 is all recorded at the server system 100 so that it is available for the analysis server 120 when it is analyzing filtered data such as data 154 received from local system 130.

Figure 20:
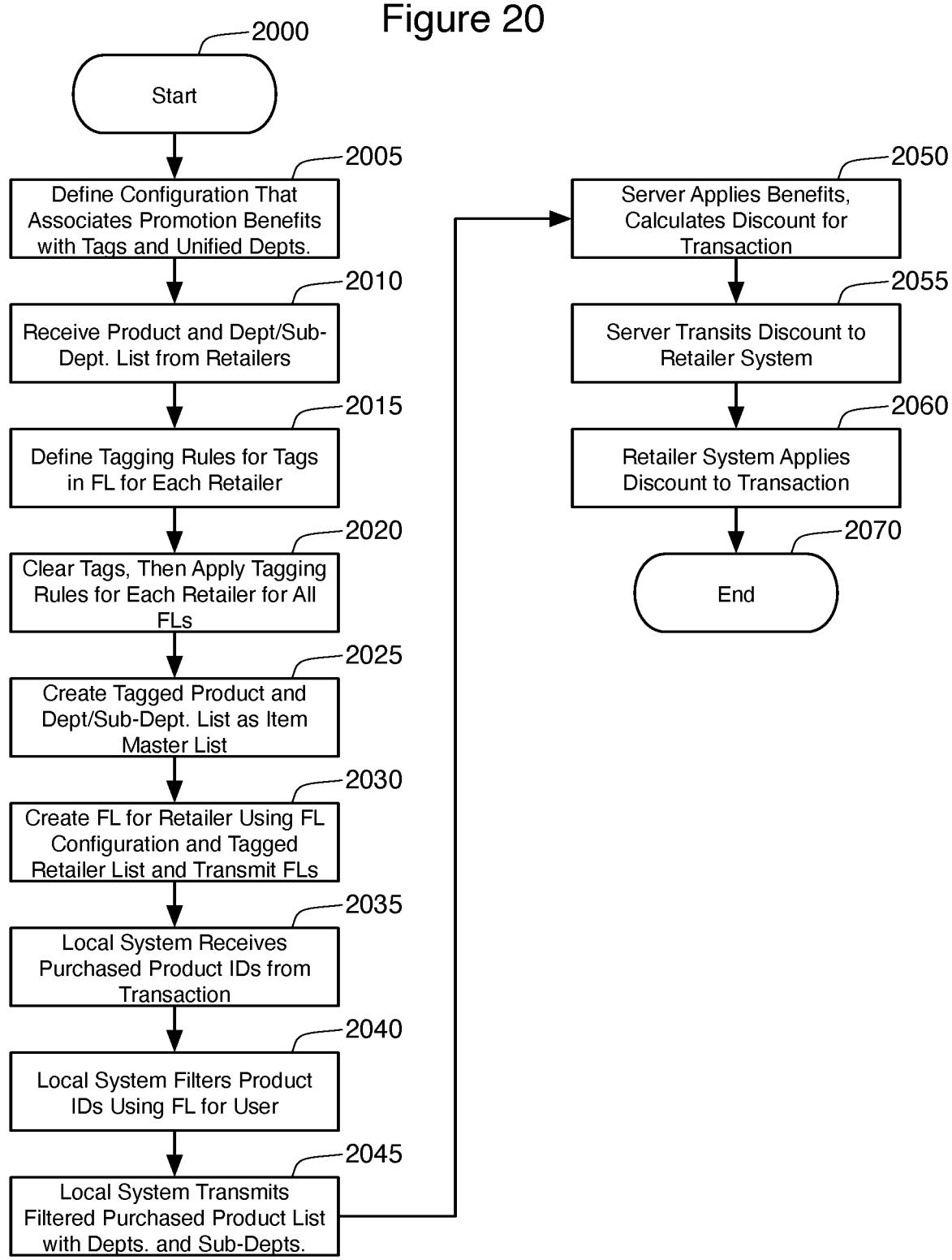
FIG. 20 is a flow chart showing an overall method of using the filter lists.

FIG. 20 shows an overall method 2000 for data 142 received at a local system 130 in order to reduce bandwidth requirements and improve processing speed and efficiency in system 10. This method 2000 utilizes the pre-analysis data 1900 shown in FIG. 19, as well as the filter list 152 generated according to the steps of method 1800.

The method 2000 starts at step 2005 with defining a filtered list configuration 700 that defines promotions 760 that accord benefits 770 to included and excluded elements that are defined using tags 740 and unified departments (and subdepartments) 750. As explained above, tags 740 can define products to include in the benefits and products to exclude. Using these tags 740 and unified departments 750, it is possible to include one or more departments 750 in a promotion 760 while excluding individual products within those departments as exceptions, or to exclude one or more departments 750 while still including individual products within those departments.

The relationship between tags 740, unified departments 750, and a retailer's departments and products are defined by rules 800. These rules 800 are specific to the configuration 700, and are also specific to individual retailers 620, 630. In order to create these rules 800, it is necessary to receive a product and department/subdepartment listing (such as listings 900, 1000) from each of these retailers 620, 630, which occurs at step 2010. Once these lists 900, 1000 are received, rules 800 are defined that determine how individual tags 740 and unified departments 750 related to the departments and items on these lists 900, 1000. The defining of these rules 800 occurs at step 2015.

Once the rules 800 are defined, step 2020 will apply the tagging rules 800 to the received lists 900, 1000. This occurs through method 1500, described above. In one embodiment, it is necessary to clear all previously assigned tags 740 before any reapplication of the rules 800. Reapplication will be required if either the rules 800 or the lists 900, 1000 are altered after the previous application of the rules 800. If changes to the rules 800 or lists 900, 1000 are properly monitored, it may be necessary to only clear a subset of the previously assigned tags 740 based on which portion of the rules 800 or lists 900, 1000 have been altered. For example, if only rules 800 related to tag K have been changed, only the previous assignments of tag K would need to be cleared in step 2020 and only the relevant rules 800 for tag K need be reapplied. Regardless, after clearing the previously assigned tags 740 as necessary, method 1500 (step 2020) reapplies the rules 800 to the received lists 900, 1000 to generate the unified item master list 1700 in step 2025.

Next, step 2030 generates the filter lists 152, 184 for the retailers 620, 630, which is described in more detail in connection with method 1800. This step 2030 also transmits the generated filter lists 152, 184 to the local systems 130, 180 of the retailers 620, 630. Step 2030 (method 1800) is also responsible for the creation of the pre-analysis data 1900.

Using local system 130 as an example, the local controller 150 receives the filter list 152 and is ready to receive raw data 142 for partial analysis, with a separate portion of the analysis occurring at the analysis server 120. The data 142 is actually received in step 2035. In the retail context, the raw data 142 will constitute purchased product identifiers from a purchase transaction. This can be seen in FIG. 19, where the raw data 142 indicates that product 4444 (from retailer department 4), was purchased twice, product 1234 (from department 1, subdepartment "b") was purchased once, and product 1236 (from department 1, subdepartment "a") was purchased twice.

At step 2040, the local controller 150 of the local system 130 filters this raw data 142 for transmission to the server system 100 using the filter list 152. The filter list 152 informs the local controller 150 that product level details should be included in the filtered data 154 for all purchase data that: i) relates to department 1, or ii) relates to product IDs 1234, 1235, and 1236. In addition, in at least one embodiment, the local controller 150 will include department level summary information (such as total purchase quantity and cost) for all departments that are relevant to the raw data 142. Thus, the filtered data 154 includes department totals for all relevant departments, namely departments 4 and 1. Furthermore, it is also possible that the data rows summarizing department level information would include subdepartments totals as well. This is the case in FIG. 19, where the filtered data 154 also includes totals for subdepartment 1-*a* and 1-*b*.

Since product specific details are to be included for all products identified in the filter list 152, product specific details are included in the filtered data for all purchases from department 1 and for all purchases of products 1234, 1235, and 1236. In this case, that means the product specific details for the 1234 and 1236 purchases are included in the filtered data 154. While the filtered data 154 looks significant in size compared to raw data 142, this is only because a specific example was chosen as an example for FIG. 19 in order to explain this embodiment. In most cases, the amount of data to be transmitted over the network 160 will be significantly reduced by apply the filter list 152.

The filtered data 154 is then transmitted to the analysis server 120 of the server system 100 at step 2045. At step 2050, the analysis server 120 then analyzes the applicability of the promotions for the data items included in the received filtered data 154. This analysis is eased by the pre-analysis 1900. The pre-analysis for promotion 1, shown in FIG. 19, indicates that anything from department 1 from this first retailer 620 should be eligible for benefit 1-*a* 722, except for items 1234 and 1235. This information is immediately available to the analysis server 120 to analyze this received data 154. This allows the analysis server 120 to quickly conclude that the purchase of item 1236 (two items for $7.00) is the only item eligible for Benefit 1-*a* (it is in department 1 of the first retailer 620, and it is not one of the 5 excluded products shown in the pre-analysis). Step 2050 also requires that the analysis server 120 consider the data records for the user identifier included with the filtered data 154 to determine whether this individual is eligible for this benefit. If so, benefit 1-*a* 722 creates a discount that available for this transaction, and information about this discount is transmitted back to the local system 130 at step 2055. The local system 130 then applies the discount to the transaction in real time at step 2060. This method 2000 is then completed at step 2070.

Obviously, additional steps are possible with method 2000, includes steps and methods described above as part of method 200 and steps and methods described in the incorporated applications. The server system 100, for example, will need to record benefits received to a local data store 115, will seek reimbursement from third parties, and will provide payment to retailers through the ACH network 122. These elements are described elsewhere, and therefore are not described here in connection with method 2000.

Raw Data Analysis

Figure 21:
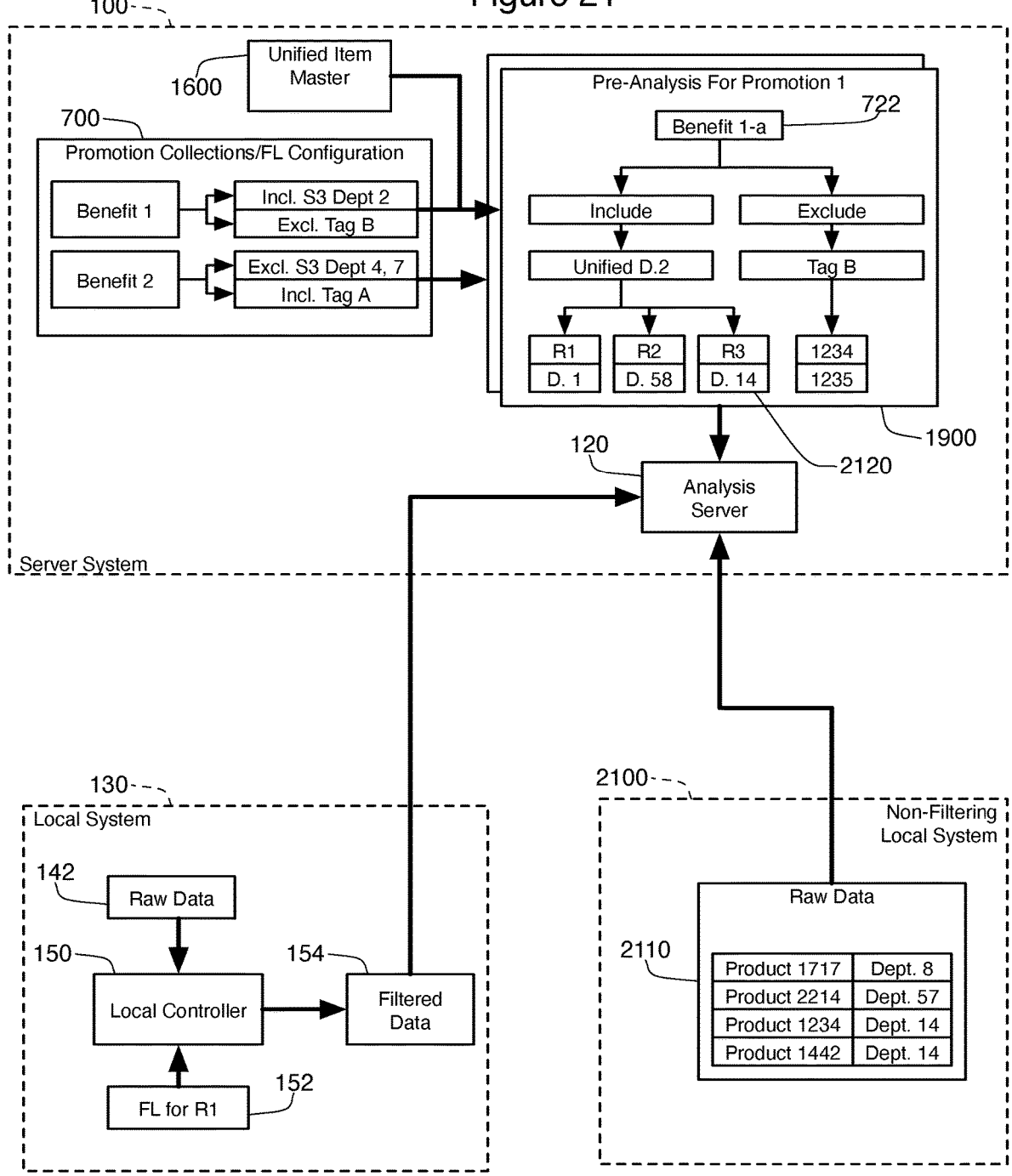
FIG. 21 is a schematic view showing the use of the pre-analysis data with unfiltered data.

FIG. 21 is similar to FIG. 19, in that the local system 130 is still shown submitting the filtered data 154 to the analysis server 120, and the analysis server 120 still uses the pre-analysis information 1900 to determine the applicability of the promotions 760. FIG. 21 differs in the inclusion of a non-filtering local system 2100. In some embodiments, some local systems 2100 do not filter their data, but rather submit all of their raw, unfiltered data 2110 for processing to the analysis server 120. The results of the analysis to be performed by the analysis server 120 should be identical whether or not the data is filtered using a filter list, although the non-filtered data 2110 will require some additional effort to analyze.

In this case, however, the pre-analysis data 1900 can greatly assist the work of the analysis server 120. In FIG. 21, non-filtering local system 2100 is associated with a third retailer. Using rules 800 associated with the third retailer, the methods and systems described above have determined that department 14 of this third retailer is linked to unified department 2. This is shown in pre-analysis data 1900 at location 2120. In order to process this raw data 2110 to determine the applicability of benefit 1-*a* 722 to the purchases in the raw data 2110, pre-analysis 1900 informs the analysis server 120 that items in department 14 will be included in this promotion, while universal product identifiers 1234 and 1235 are to be excluded. This allows the analysis server 120 to quickly identify that only the purchase of product 1442 in the raw data 2110 is eligible for benefit 1-*a* 722.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A computer-implemented method comprising:
receiving, by one or more processors and from a local system, list group identifiers and item identifiers associated with the list group identifiers;
mapping, by the one or more processors, (i) the list group identifiers to unified group identifiers based at least in part on a set of mapping rules and (ii) the item identifiers to one or more tags based at least in part on a set of keyword rules;
accessing, by the one or more processors, a configuration file in a database that defines (i) one or more processing segments to be performed by the local system, (ii) a relevant subset of the unified group identifiers, and (iii) a relevant tag of the one or more tags;
generating, by the one or more processors and based at least in part on the configuration file, a filter list customized for the local system, wherein the filter list comprises (i) a subset of the list group identifiers that are associated with the relevant subset of the unified group identifiers, and (ii) a subset of the item identifiers identified based at least in part on the one or more processing segments;
transmitting, by the one or more processors and to the local system, the filter list, causing the local system to apply the filter list to pre-analysis data to generate filtered data;
responsive to receiving, by the one or more processors and from the local system, the filtered data, generating, by the one or more processors and based at least in part on the one or more processing segments and the filtered data, augmented data comprising (i) the filtered data and (ii) one or more item specific datasets that are relevant to the filtered data;
automatically updating, by the one or more processors, based at least in part on the augmented data, and for the local system, available benefits in the database; and
responsive to updating the database, triggering, by the one or more processors, a resource exchange with the local system.

2. The computer-implemented method of claim 1, further comprising:
responsive to detecting changes to data required by a server system associated with the local system, updating the filter list.

3. The computer-implemented method of claim 1, wherein the filtered data is received and processed by an analysis server that is distinct from a filter list server that generated the filter list.

4. The computer-implemented method of claim 1, wherein the one or more processing segments are defined based at least in part on configuration data comprising data required for the one or more processing segments.

5. The computer-implemented method of claim 4, wherein (a) the configuration data defines a first processing segment of the one or more processing segments that (i) includes a first unified group identifier of the unified group identifiers, and (ii) excludes a first tag of the one or more tags, and (b) the first processing segment is processed against a first subset of the filtered data that is both associated with the first unified group identifier and associated with any tag of the one or more tags that is different from the first tag.

6. The computer-implemented method of claim 4, wherein (a) the configuration data defines a second processing segment of the one or more processing segments that excludes a second unified group identifier of the unified group identifiers and includes a second tag of the one or more tags, and (b) the second processing segment is processed against a second subset of the filtered data that is both associated with the second unified group identifier and associated with any tag of the one or more tags that is different from the second tag.

7. The computer-implemented method of claim 6, wherein the filtered data includes summary data summarizing a plurality of items for a subset of the list group identifiers that are not identified in the filter list.

8. The computer-implemented method of claim 4, further comprising:
   generating pre-analysis data for the one or more processing segments,
   wherein the pre-analysis data comprises (a) one or more additional list group identifiers for local systems associated with the unified group identifiers, and (b) non-redundant item identifiers associated with the one or more tags and not associated with any of the relevant subset of the unified group identifiers for the one or more processing segments.

9. The computer-implemented method of claim 8, wherein generating the augmented data corresponding to the filtered data is further based at least in part on the pre-analysis data.

10. The computer-implemented method of claim 9, further comprising:
    receiving, from a second local system, unfiltered data; and
    processing the unfiltered data based at least in part on the pre-analysis data.

11. The computer-implemented method of claim 1, wherein (1) the list group identifiers comprise list departments and list sub-departments, (2) the unified group identifiers comprise one or more unified departments and one or more unified sub-departments, (3) at least one list sub-department is associated with one of the one or more unified departments, and (4) at least one list department is associated with one of the one or more unified sub-departments.

12. The computer-implemented method of claim 11, wherein the local system is associated with a location, the item identifiers are associated with one or more transaction items available at the location, and the list departments and list sub-departments are used to categorize the one or more transaction items.

13. The computer-implemented method of claim 1, wherein the subset of the item identifiers are associated with one or more unified group identifiers distinct from the relevant subset of the unified group identifiers.

14. The computer-implemented method of claim 1, wherein mapping the list group identifiers to unified group identifiers and (ii) the item identifiers to one or more tags comprises:
    generating association data by associating the list group identifiers with the unified group identifiers based on the set of mapping rules,
    storing the association data in a master list,
    associating the item identifiers with a first subset of the one or more tags based on associations between the item identifiers and the list group identifiers,
    storing the item identifiers and the first subset of the one or more tags in the master list,
    identifying a subset of the item identifiers that match list group identifiers and key text found in the set of keyword rules,
    associating the subset of the item identifiers with a second subset of the one or more tags based on the set of keyword rules, and
    storing the subset of the item identifiers and the second subset of the one or more tags based in the master list.

15. The computer-implemented method of claim 14, wherein a first tag of the one or more tags and a second tag of the one or more tags are considered to conflict when both the first tag and the second tag cannot be associated with a single item identifier.

16. The computer-implemented method of claim 15, further comprising resolving a conflict when the first tag is associated with a first item identifier by a first set of rules and the second tag is associated with the first item identifier by a second set of rules, wherein the conflict is resolved by associating the first item identifier with the first tag when a first weight associated with the first set of rules is greater than a second weight associated with the second set of rules.

17. The computer-implemented method of claim 16, wherein one or more weights are assigned to a set of rules based at least in part on a specificity of the set of rules relative to one or more other sets of rules.

18. The computer-implemented method of claim 12, wherein the one or more processing segments are associated with one or more available alterations to the pre-analysis data.

19. A system comprising one or more processors and at least one memory storing processor executable instructions that, when executed by the one or more processors, cause the one or more processors to:
    receive, from a local system, list group identifiers and item identifiers associated with the list group identifiers;
    map (i) the list group identifiers to unified group identifiers based at least in part on a set of mapping rules and (ii) the item identifiers to one or more tags based at least in part on a set of keyword rules;
    access a configuration file in a database that defines (i) one or more processing segments to be performed by the local system, (ii) a relevant subset of the unified group identifiers, and (iii) a relevant tag of the one or more tags;
    generate, based at least in part on the configuration file, a filter list customized for the local system, wherein the filter list comprises (i) a subset of the list group identifiers that are associated with the relevant subset of the unified group identifiers, and (ii) a subset of the item identifiers identified based at least in part on the one or more processing segments;
    transmit, to the local system, the filter list, causing the local system to apply the filter list to pre-analysis data to generate filtered data;
    responsive to receiving, from the local system, the filtered data, generate, based at least in part on the one or more processing segments and the filtered data, augmented data comprising (i) the filtered data and (ii) one or more item specific datasets that are relevant to the filtered data;
    automatically update, for the local system and based at least in part on the augmented data, available benefits in the database; and
    responsive to updating the database, trigger a resource exchange with the local system.

20. One or more non-transitory computer-readable storage media including instructions that, when executed by one or more processors, cause the one or more processors to:
    receive, from a local system, list group identifiers and item identifiers associated with the list group identifiers;
    map (i) the list group identifiers to unified group identifiers based at least in part on a set of mapping rules and (ii) the item identifiers to one or more tags based at least in part on a set of keyword rules;

access a configuration file in a database that defines (i) one or more processing segments to be performed by the local system, (ii) a relevant subset of the unified group identifiers, and (iii) a relevant tag of the one or more tags;

generate, based at least in part on the configuration file, a filter list customized for the local system, wherein the filter list comprises (i) a subset of the list group identifiers that are associated with the relevant subset of the unified group identifiers, and (ii) a subset of the item identifiers identified based at least in part on the one or more processing segments;

transmit, to the local system, the filter list, causing the local system to apply the filter list to pre-analysis data to generate filtered data;

responsive to receiving, from the local system, the filtered data, generate, based at least in part on the one or more processing segments and the filtered data, augmented data comprising (i) the filtered data and (ii) one or more item specific datasets that are relevant to the filtered data;

automatically update, for the local system and based at least in part on the augmented data, available benefits in the database; and responsive to updating the database, trigger a resource exchange with the local system.

* * * * *